United States Patent

Nozue et al.

[11] Patent Number: 5,845,262
[45] Date of Patent: Dec. 1, 1998

[54] ELECTRONIC PRESS INFORMATION DISPATCHING SYSTEM

[75] Inventors: Tatsuhiro Nozue, Yokohama; Makoto Kasuya, Tokyo, both of Japan

[73] Assignee: Hitachi, Ltd., Tokyo, Japan

[21] Appl. No.: 677,593

[22] Filed: Jul. 9, 1996

[30] Foreign Application Priority Data

Jul. 10, 1995 [JP] Japan .................................... 7-173789
Jul. 10, 1995 [JP] Japan .................................... 7-173790

[51] Int. Cl.[6] .................................................. H01B 7/185
[52] U.S. Cl. ................... 705/26; 395/200.33; 395/200.47
[58] Field of Search ............................... 705/26, 16, 18; 395/200.33, 200.47, 200.49, 200.68; 345/329, 335; 455/3.2, 4.2, 425, 427, 463

[56] References Cited

U.S. PATENT DOCUMENTS 5,405,505  4/1995  Levinson .
5,694,546  12/1997  Reisman .................................... 705/26
5,748,931  5/1998  Jones et al. ................................ 1/1

FOREIGN PATENT DOCUMENTS

A-1-255997  10/1989  Japan .
A-2-234296  9/1990   Japan .
A-5-89363   4/1993   Japan .
A-6-54101   9/1994   Japan .
A-333156    12/1994  Japan .

Primary Examiner—Thomas Peeso
Attorney, Agent, or Firm—Frohwitter

[57] ABSTRACT

A system for mainly transferring various information of a newspaper, a magazine, an advertisement, and the like by dot data is provided. Data information provided from a newspaper company, publishing companies, and the like is converted into electronic press information via an electronic press producer 20. The electronic press information is dispatched from a center to an information vending machine through a satellite line or a terrestrial line. Dispatched press data is once accumulated to a recording unit in the information vending machine. When it is identified that an information fee has been paid by cash or a prepaid card, desired data in the information accumulated in the recording unit is written into a recording medium such as an IC card or the like of a consumer.

30 Claims, 15 Drawing Sheets

FIG. 5

| TIME | TRANSMISSION DATA | | | | |
|---|---|---|---|---|---|
| | ch1 | ch2 | ch3 | · · · · | chn |
| 0 | SYNC | | | | |
| | | SYNC | SYNC | | SYNC |
| | DISTRICT A1 | DISTRICT B1 | DISTRICT C1 | · · · · | DISTRICT N1 |
| | DISTRICT A2 | DISTRICT B2 | DISTRICT C2 | · · · · | DISTRICT N2 |
| | DISTRICT a1 | DISTRICT b1 | DISTRICT c1 | · · · · | DISTRICT n1 |
| | DISTRICT a2 | DISTRICT b2 | DISTRICT c2 | · · · · | DISTRICT n2 |
| | CHANNEL RESET | | | | |
| | MAGAZINE | | | | |
| | END COMMAND | | | | |

Rows DISTRICT A1–N2: NEWSPAPER
Rows DISTRICT a1–n2: ADVERTISEMENT

WHEN NEXT PICTURE PLANE EXISTS AT THE TIME OF
TITLE DISPLAY SCREEN THE PRESENCE OF NEXT PAGE
IS DISPLAYED AT RIGHT LOWER CORNER
SWITCHING OF PAGES IS EXECUTED BY PAGE
UPDATE BUTTON OF CONTROL TERMINAL 96

ELECTRONIC PRESS INFORMATION DISPATCHING SYSTEM

BACKGROUND OF THE INVENTION

The present invention relates to a system in which a production, a distribution, and a transmission of electronic press information such as newspaper, magazine, advertisement, book, or the like which is periodically distributed and which a general consumer uses by a portable terminal is executed by using a satellite or a terrestrial line.

Hitherto, there has been proposed a system to realize what is called a paperless society such that in place of the use of printed matters (press information such as newspaper, magazine, or the like) by a paper, the press information is converted into electronic information and is distributed and transmitted and sold by using a terrestrial line, a satellite communication, or the like, and a consumer uses the electronic press information by displaying it.

However, the above system is limited to the use in a desk-top type display such as a television or the like which receives information at each home and doesn't have a form such that electronic press information such as newspaper, magazine, or the like is easily purchased from a vending machine installed in a station stall, on a street, or the like and is used by a portable terminal. The above system has a form such that the user (receiver) purchases information produced by a publishing company or a broadcasting company from the transmission side as one publishing company or broadcasting company and is not a system such that information of a plurality of publishing companies or broadcasting companies is collected and is transmitted in a lump. The receiver, therefore, must make contracts with a plurality of publishing companies or broadcasting companies and each of the publishing companies or broadcasting companies also needs to perform an activity such as money collection or the like.

First, the delivery by the paper of publication has the following problems. (1) A large quantity of papers are consumed. (2) Since the newspaper has the A2 size, it is difficult to read it in a narrow space, for example, in a crowded train or the like. (3) When the user wants to read a plurality of papers, its volume is very large. (4) Since many persons are required for conveyance and delivery, the costs are high.

The prior art has the following subjects. If the user merely receives such information at each home and uses by a desk-top type display such as a television or the like, he cannot easily purchase and use it at anytime and anywhere like a present newspaper, magazine, or the like. It is, therefore, a subject to construct an electronic press information dispatching system of a form such that a vending machine for selling electronic press information is installed in a station stall, on a street, or the like, the user easily purchases the electronic press information and uses it by a portable terminal. Such an electronic press information distributing and transmitting system needs to be constructed so as to have the following features in the sales, recording, transmission, and edition of electronic press information.

As for the sales, hitherto, the user (receiver) first makes a contract with one publishing company or broadcasting company and purchases information manufactured by the publishing company or broadcasting company. However, in the electronic press information distributing and transmitting system of a form such that information is used by a portable terminal, if information of a plurality of publishing companies or broadcasting companies cannot be selected and purchased, it will be inconvenient for the user. Therefore, a system construction such that electronic press information of a plurality of publishing companies is handled and transmitted to stalls and vending machines is demanded.

Like a user (receiver) of the conventional desk-top type information distributing and transmitting system, there is also considered a method whereby a stall or vending machine selects, receives, collects, and sells (including the money collection per publishing company or broadcasting company) information of a plurality of publishing companies or broadcasting companies. However, it is more practical to construct a system such that the transmitting side collects information of a plurality of publishing companies or broadcasting companies and transmits those information in a lump.

In such a system, in order to sell a newspaper, magazine, or the like in a manner similar to the conventional station stall or the like, a method of receiving the electronic press information, a method of displaying the press to select a desired publishing company by the purchaser, a method of writing the electronic press information to a recording medium to be sold, and the like are subjects.

There are the following subjects with respect to the edition and transmission of the press information. The electronic press information to be distributed and transmitted can be largely classified into two information. One is the information which is broadcast transmitted at low costs for a great number of vending machines, as targets, installed in the whole country or a relatively wide district. The other is the information such as information or advertisement for use in a limited district which is distributed and transmitted to a relatively narrow district as a target. A distributing method (using method of a line, an editing method of press information for this purpose, a method of identifying a district for reception, and the like) which considers both of those information is a subject.

There is also a subject to enable electronic press information distributed and transmitted to stalls and vending machines to be used even in general homes and bookstores.

SUMMARY OF THE INVENTION

To solve the above subjects, according to the invention, there is constructed a system in which a center for collecting electronic press information, recording, editing, and transmitting by a satellite communication is provided and electronic press information vending machines are installed at locations such as station, street, and the like where many people come together and are used by portable terminals.

The center receives press information classified on a unit basis of each electronic press information producer from each of the electronic press information producers, classifies the received press information on the basis of the district characteristics of the information, adds codes (also including a code to designate all of the districts or a code to designate a plurality of districts in a lump) to identify a district for transmission on a press information unit basis, and transmits those press information by one or a plurality of lines in accordance with the order or in parallel.

The vending machine comprises: an electronic press information selling system constructed by a communicating system, a signal processing system, a displaying system, and a data writing system; and a vending machine common system constructed by a charging system, a money charging system, a sheath, and a power source system. The communicating system is constructed by an antenna, a CS digital tuner, and the like. The signal processing system is constructed by a data processing unit and a recording unit. A press portion display, a title display, and a date display of the displaying system which are arranged by the number corresponding to a plurality of presses and tens of sets each composed of a press button, an old edition button, a write instructing button of the data writing system, an IC memory card inserting port as a part of an IC memory card writing mechanism, a cash inserting port and a change ejecting port as a part of a cash processing unit of the charging system, a no-change display unit, an input money amount (prepaid card balance) display unit, and a prepaid card inserting port and a cancelling button as parts of a prepaid card processing unit are arranged to the front surface of the sheath. A terminal for a local area network and an antenna terminal are provided on the rear surface. An antenna terminal is also provided on an upper surface. An antenna for communication can be mechanically attached.

Further, according to the invention, a receiving terminal for receiving the electronic press information distributed and transmitted to the vending machine is installed in a general home and a bookstore.

In the above electronic press information distributing and transmitting system, data of a newspaper, a magazine, an advertisement, and the like is transmitted by using a satellite line or a terrestrial line, is received by an outdoor receiving apparatus built in the information vending machine, and is once accumulated into a recording unit. In order to use the electronic press information by using the portable terminal, a consumer purchases it from the electronic press information vending machine through a recording medium. Therefore, persons who are required for conveyance and delivery can be omitted and the information can be transmitted at low costs.

The center classifies the press information which is received from each electronic press information producer and which has been classified on a unit basis of each electronic press information producer on the basis of district characteristics of the information, adds codes (also including a code to designate all of the districts or a code to designate a plurality of districts in a lump) which correspond to the districts and identify the districts on a unit basis of the press information, distributes and transmits those press information classified every district by one or a plurality of lines in accordance with the order or in parallel, adds a code to identify the district to the transmitted press information, and transmits the resultant information to the electronic press information vending machine installed in each district, thereby allowing the different electronic press information to be received in each district.

According to the electronic press information vending machine, the electronic press information is received by an antenna and is subjected to a demodulation, a bit synchronization, a frame synchronization, an error correction, and the like by a CS digital tuner, and after that, the descrambled electronic press information is set into one file per press information unit (for example, one newspaper) by the data processing unit of the signal processing system and is recorded into the recording unit. Titles of all kinds of newspapers, magazines, and advertisements of the latest edition recorded in the vending machine are displayed by the title display for displaying by an LED or a printing to a paper or the like. Dates (including the distinction between the morning edition and the evening edition of the newspaper) of those presses are displayed by the date display. Prices are displayed on the press button.

The purchaser presses a desired news item selecting button of a newspaper or a magazine and displays a predetermined part of a press such as cover of the magazine, right upper ¼ of the first page of the newspaper, or the like by the press portion display, thereby selecting a press to be purchased. The purchaser inserts a recording medium of a portable terminal such as an IC memory card or the like, inserts cash or a prepaid card, and subsequently presses the write instructing button, so that the write control unit of the data writing system and the IC memory card writing mechanism records the electronic press information to the recording medium that is inserted by the consumer.

When the old edition button is pressed, the information (if the latest information relates to the evening newspaper, the morning newspaper at the very day) that is one edition older than the newspaper or magazine shown by the press button which was pressed latest is displayed by the press portion display on which the latest edition has been displayed so far. Each time the old edition button is pressed, the old edition is displayed one by one. The date shown in the date display is changed in accordance with the old edition. A fee is collected in cash or by a prepaid card.

The electronic press information distributed and transmitted to the electronic press information vending machine is also received even at a general home after making a contract and a news item is displayed by using a television or the like at home.

Further, the electronic press information for the electronic press information vending machine is received by a receiving terminal of a bookstore.

BRIEF DESCRIPTION OF THE DRAWINGS

Preferred embodiments of the present invention will now be described in conjunction with the accompanying drawings, in which:

FIG. 5 is a table showing a data transfer procedure of the invention;

DESCRIPTION OF THE PREFERRED EMBODIMENT

An embodiment of an electronic press information distributing and transmitting system according to the invention will now be described hereinbelow.

(Outline of system)

[Objects]

According to the system, in place of the use of the press information of conventional printed matters using papers, namely, newspaper, magazine, or the like, the press information is converted into electronic information and the electronic information is distributed and transmitted to vending machines installed in a station and the like and is sold there. The consumer records the electronic press information from the vending machine to an electronic recording medium such as IC card, magnetooptic disk, or the like, thereby purchasing the information. On the other hand, the consumer displays the electronic press information by a portable terminal such as a portable display or the like, thereby using such information. The above system is a system including the information production, distribution, and consumption for such purposes and is a system to realize what is called a paperless society.

If such a system is used at each home or at an individual level and becomes media in place of the papers, the system will be spread at an increasing tempo and the market will be further developed. There is a possibility such that the market will be able to become a large market in which one person possesses one portable terminal. As the vending machines of electronic press information are more and more installed and spread, the electronic press information can be easily purchased in a station stall, on a street, or the like and necessary information can be obtained at any place. Further, as information included individually, not only a newspaper but also all of character information of a book, a magazine, and the like can be obtained.

[System construction]

Figure 1:
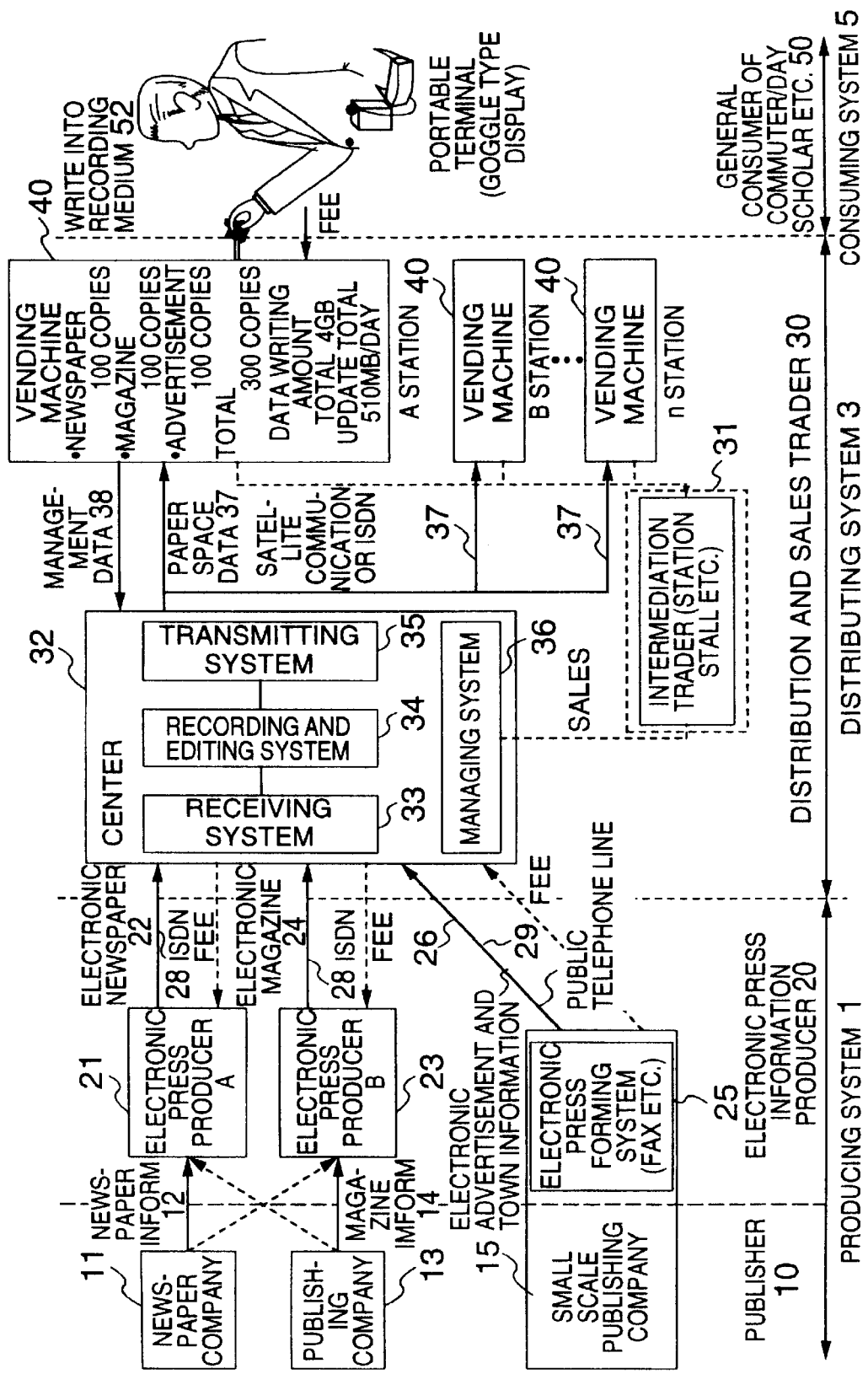
FIG. 1 is a schematic diagram of a system construction of the invention.

FIG. 1 shows an outline of a construction of an electronic press information distributing and transmitting system according to the invention. The electronic press information distributing and transmitting system is mainly constructed by three subsystems such as producing system 1, distributing system 3, and consuming system 5. The producing system 1 is constructed by a publisher 10 and an electronic press information producer 20. Further, the publisher 10 is divided into a newspaper company 11, a publishing company 13, and a small scale publishing company 15.

As for the small scale publishing company 15, the publisher 10 and electronic press information producer 20 are not separated. An electronic press forming system 25 which has the same function as that of the electronic press information producer 20 is provided in the small scale publishing company 15.

The distributing system 3 is constructed by an electronic press information distribution and sales trader 30 and an intermediation trader 31. The electronic press information distribution and sales trader 30 has a center 32 and vending machines 40. The center 32 is constructed by a receiving system 33, a recording and editing system 34, a transmitting system 35, and a managing system 36.

The consuming system 5 is constructed by general consumers 50 such as commuters, day scholars, and the like and portable terminals 51 which they possess. The portable terminal 51 may be a book-type portable terminal or can be also a goggle-type portable terminal.

Newspaper information 12 is sent from the newspaper company 11 to an electronic press producer 21. The electronic press producer 21 processes the received newspaper information to electronic newspaper information 22 and transmits the electronic newspaper information 22 to the center 32 of the distribution and sales trader via, for example, an ISDN line 28. Similarly, magazine information 14 is sent from the publishing company 13 to an electronic press producer 23. The electronic press producer 23 processes the received magazine information to electronic magazine information 24 and transmits the electronic magazine information 24 to the center 32 of the distribution and sales trader via, for example, the ISDN line 28. The small scale publishing company 15 which handles an advertisement and town information converts the advertisement and town information into electronic information by the electronic press forming system 25 and transmits electronic advertisement and town information 26 to the center 32 of the distribution and sales trader via, for example, a public telephone line 29.

At the center 32 of the distribution and sales trader 30, electronic press data 37 obtained by editing the received electronic newspaper information 22, electronic magazine information 24, and electronic advertisement and town information 26 is distributed and transmitted to the vending machines 40 installed at a station, and the like through a satellite communicating system or ISDN line.

It is desirable to install the vending machine 40 at a location such as station, street, or the like where people gather. Further, a plurality of vending machines 40 which are installed in a station and the like can be connected to a satellite communication receiving system via a local area network. It is also desirable to install the center at a location where it is convenient to collect the electronic newspaper information 22, electronic magazine information 24, or electronic advertisement and town information 26.

Figure 2:
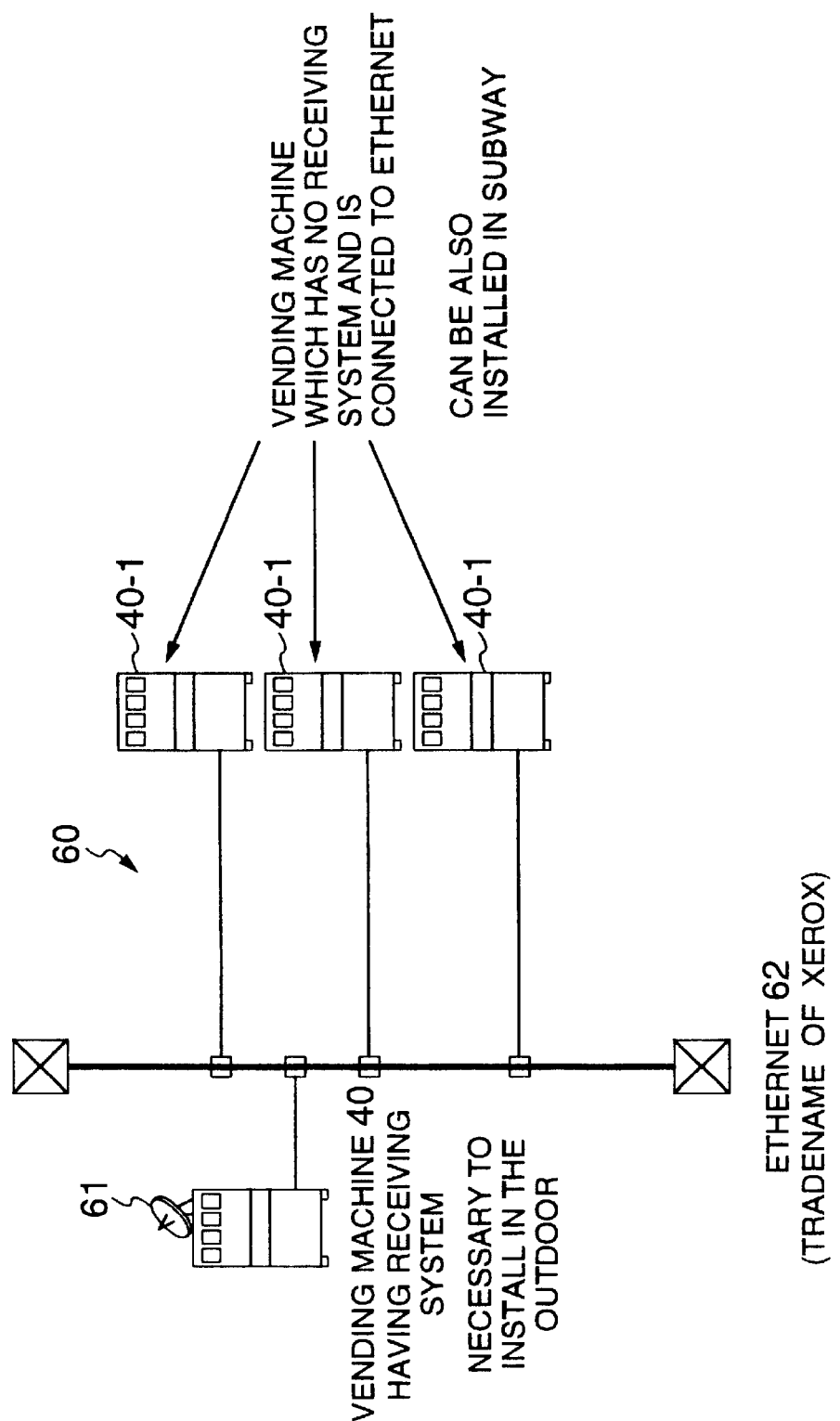
FIG. 2 is a diagram showing an example of a construction of a local area network of the invention.

An example of a local area network of the vending machines using the Ethernet will now be described with reference to FIG. 2. The local area network which is used in the distributing system 3 is constructed by: the vending machines 40 each having therein a receiving system 61 which needs to be installed in the outdoor; and vending machines 40-1 which are connected to the vending machine 40 via an Ethernet 62 and each of which doesn't have a receiving system therein. Although the vending machine 40 is installed in a station, on a street, or the like, it is predicted that there is a case where a plurality of vending machines 40 are installed in a certain narrow range such as a station yard or the like. In this instance, when electronic press information is received by one vending machine from the center and is distributed and transmitted to the others therefrom, it is more efficient than a method whereby the electronic press information is independently received by each vending machine from the center. This is because there is no need to prepare communicating devices for all of the vending machines and one vending machine 40 having the receiving system 61 therein is installed on the ground and receives the electronic press information by a satellite communication and distributes the received electronic press information to the other vending machines, thereby enabling the vending machine to be installed at a location such as a subway yard or the like where a communication wave doesn't reach. It is also possible to construct in a manner such that the ISDN line is connected to one vending machine 40 and the electronic press information is received and the received electronic press information is distributed and transmitted to the other vending machines.

(Flow of electronic press information data)

[Data amount of electronic press information data]

When considering a newspaper as an example of press data to be handled, the press information which the newspaper has is constructed by: "character" information such as headline, body news item, advertisement news item, etc.; and "image" information such as photograph, figure, etc. If such press information is handled as graphics data, the whole press can be expressed as an image. Such a method is similar to a data handling method of an image scanner or a facsimile. To express the newspaper space by an image, it is necessary to express by a dot resolution such as not to lose the character information of the news item. In a standard printer, since a character is expressed by a square of 24 dots, a resolution per character of the news item has to be set to at least a resolution that is equal to or larger than such a dot resolution. For example, since one character of a body news item of a newspaper is constructed by a square of about 3 mm, when it is expressed by the square of 24 dots, the resolution is equal to about 8 dots/mm=about 203 dpi (dots per inch). Upon display, an information amount of one whole page of the press becomes a problem. A calculating step is shown in Table 1. Now, assuming that the press is set to the A2 size (420 mm×594 mm), in case of a resolution of 200 dpi, 3307 dots are needed in the horizontal direction and 4677 dots are needed in the vertical direction, so that a data amount is very large. Such a dot number is the same as that of the press of 400 dpi of the A4 size. In this case, a data amount of binary dot data is equal to 15.4 Mbits=1.93 MB (B=bytes).

TABLE 1

Data amount per one paper space (newspaper, magazine)

| | Newspaper | | Magazine |
|---|---|---|---|
| Item | A2 | In case of A4 size | In case of A4 size |
| Size (mm × mm) | 420 × 594 | 210 × 297 | 210 × 297 |
| Resolution (dpi) | 200 | 400 | 200 |
| Bit number (Mbit) | 15.5 | 15.5 | 3.9 |
| Horizontal (dots) | Horizontal 3307 | Horizontal 3307 | Horizontal 1654 |
| Vertical (dots) | Vertical 4677 | Vertical 4677 | Vertical 2339 |
| Data amount (MB) | 1.93 | 1.93 | 0.48 |

Table 2 shows data amounts per newspaper and magazine. Now, assuming that one morning newspaper has 50 pages and was compressed into 1/10 by using some data compressing method, a recording medium of 10 MB is necessary. In case of a magazine, as binary dot data without agate of the lowest A4 size and 200 dpi (2340 dots in the vertical direction×1650 dots in the lateral direction), when 3.86 Mbits=0.483 MB and one magazine has 500 pages and a data compression ratio is equal to 1/10, it is predicted that a recording medium of 25 MB is needed.

TABLE 2

Data amount per newspaper (magazine)

| Item | Newspaper | Magazine |
|---|---|---|
| Page number | 50 | 500 |
| Data compression ratio | 0.1 | 0.1 |
| Data amount per paper space (MB) | 1.93 | 0.48 |
| Data amount per newspaper (magazine) (MB) | About 10 | About 25 |

Although a color page, a halftone, and the like also exist in the newspaper and magazine, assuming that 1 dot=8 bits, a capacity that is eight times as large as binary dots is needed. This is equivalent to 57 pages for binary dots so long as, for example, one color page exists among 50 pages. The color pages of about one or two pages of the newspaper or about ten pages of the magazine lie within a predicted range of the capacity. When character data is handled as character information, since one page of the newspaper is constructed by 14 columns and 12 characters/line and 80 lines/column, the number of characters is equal to 13440 characters. Since a data amount of one character is equal to 2 B, a data amount of the newspaper having 50 pages is equal to about 1.3 MB and is smaller than the dot data.

An amount of data which is accumulated in the vending machine will now be considered. It is now considered that the new edition has been updated to the latest data and the old edition can be also bought (in case of a magazine, one week before or the like). It is now assumed that 100 (corresponding to five days) newspapers (10 MB/newspaper) including the morning edition, evening edition, and old edition are accumulated. A data amount of 1 GB is predicted. As for the magazine (30 MB/magazine), now assuming that 100 magazines are accumulated, the data amount of 3 GB is predicted. In case of an advertisement, now assuming that 100 advertisements of the A4 size are accumulated, a data amount of 10 MB is predicted. Thus, it is estimated that the total amount is equal to about 4 GB. (Table 3)

TABLE 3

Estimation of memory capacity of vending machine

| | Data amount per newspaper or magazine (MB) | The number of newspapers (magazines) | Total (GB) |
|---|---|---|---|
| Newspaper | About 10 | 100 | 1 |
| Magazine | About 30 | 100 | 3 |
| Advertisement | About 0.1 | 100 | 0.01 |
| | | Total | About 4 |

A time zone is limited in the distribution and transmission of a newspaper or the like. Actually, the distribution and transmission of about (1 hour×2 times) in a day is predicted. However, as an amount of data to be updated once, 200 MB is predicted for 20 newspapers, 300 MB is predicted for 10 magazines, and about 10 MB is predicted for 100 advertisements of the A4 size. Thus, the total data amount to be updated is estimated to be 510 MB. By transmitting data at a rate of 1.5 Mbps., a time of 45 minutes and 20 seconds (17 minutes and 47 seconds for the newspapers; 26 minutes and 40 seconds for the magazines; 53 seconds for the advertisements) is required.

[Distribution and transmission of electronic press information data]

Vending machines each of which sells a plurality of (100 or more) electronic press information are installed at several locations (for example, stations) in the whole country or a certain district. Electronic press information data is distributed and transmitted from one center and managed. For example, assuming that average four vending machines are arranged at each of 5000 locations, total 20000 vending machines are managed from one center. When using the foregoing local area network, there are 5000 receiving positions.

In this case, as presses (converted into the electronic information) to be sold, there are a press such as a magazine which is sold as a national edition or is commonly sold by each vending machine and a press such as newspaper including each district edition, advertisement with district characteristics, or the like which is selected and sold every district or the like in which the vending machines were installed.

As mentioned above, it is predicted that the number of presses whose contents differ every district or the number of target districts to which newspapers (district papers) which are distributed and transmitted to only a certain district is equal to about 50. Therefore, the number of vending machines to send the same data is equal to about 100. In case of the advertisements, when the district is divided into hundreds regions, the number of vending machines to send the same data is equal to about 10.

In the embodiment, it is necessary to commonly distribute and transmit everyday the data of 300 MB of the magazines to all of the districts and to separately distribute and transmit the data of 200 MB for the newspapers to about 50 districts and the data of 10 MB for the advertisements to about 500 districts.

A data format will now be described. As a principle, data formats of the electronic press information have to be unified for the whole system. Even if the electronic press information from the electronic press information producer 20 is not unified, it is sufficient to convert the format by the recording and editing system 34 of the center 32. However, costs are needed for edition. On the other hand, when the electronic press information is sold by the vending machines 40, it is necessary that a plurality of press information can be used by the same portable terminal. The unity of the data formats is indispensable. As a unified format, for example, it is considered to use an MMR. The MMR is a format which is used even in a facsimile or the like because of the reasons such that data can be generally easily formed and complicated hardware and software are unnecessary in the consuming system, a compression ratio is high, and the like.

A flow of the electronic press information data will now be described. The producer 20 who manufactures electronic presses converts the newspaper space 12 and magazine space 14 formed by the publisher 10 such as newspaper company 11, publishing company 13, or the like into the electronic newspaper 22 and electronic magazine information 24 on the basis of the electronic press information of a specified format of the system.

As a manufacturing method of the electronic press, there is a method of forming dot data by using a scanner or the like, a method of forming characters, an addition of other annexed data, or the like. To merely form dot data in the press, an image reading using the scanner is considered, or a facsimile transmission is further considered as a simpler method. There is a method of constructing a press by characters, dot data such as a photograph or the like, and annexed data indicative of a layout of them. There is an advantage as a reduction of the total data amount. However, it is necessary to again edit the press on the reception side.

When the press is read as it is by using the scanner, there is a case where a small character is broken in dependence on a reading precision. However, even in case of characters of the same size, characters for displaying characters (of, for example, the JIS standard) are not broken but can be read. This is because the characters for character display have been corrected so as to be easily read even for a display of a low precision. When a line inserted between pixels to be read by the scanner is displayed, it becomes a broken line. However, such a phenomenon doesn't occur in the characters for character display. Therefore, if small characters of a newspaper, characters in a balloon of a comic picture, or the like are converted into characters for character display, they can be easily read.

The small scale publishing company 15 has the electronic press forming system 25 therein and converts the electronic advertisement and town information 26 into the electronic press information. There is a facsimile as a simplest example of the electronic press forming system 25. For example, hitherto, there is considered a case where a trader concerned who prints inserted bills of a supermarket store or the like which were inserted into the newspapers transmits the inserted bills by a facsimile and make an advertisement as electronic information. In this instance, the electronic press information distribution and sales trader 30 uses the information transmitted via the facsimile as electronic information as it is. At this time, any one of the G4 machine corresponding to the ISDN line and the G3 machine corresponding to the public telephone line can be used as a facsimile.

Further, there is also a case where the electronic press information distribution and sales trader 30 also commonly performs a work of the electronic press producer 20 in the center 32. In such a case, the publisher 10 brings information to the center 32 by "papers". The transmission and reception of the electronic press information between the electronic press producer 20 and the electronic press information distribution and sales trader 30 can be also executed by a recording medium such as a magnetooptic disk or the like. A reading apparatus of the recording medium such as scanner, magnetooptic disk, or the like is installed in the center and the press information which was brought from the publisher 10 is converted into the electronic press information or the information which has already been converted into the electronic information is obtained by the recording medium. If necessary, in this instance, a re-edition such as format conversion, addition of annexed information, or the like is executed.

The electronic press information distribution and sales trader 30 individually makes a contract with a plurality of electronic press information producers 20, thereby obtaining specific electronic press information (or in a certain contract range) in the electronic press information formed as mentioned above. Therefore, the line for connecting both of them is provided in a one-to-one corresponding relation in principle and a broadcast performance to a number of traders is unnecessary. Since an amount of information to be handled is large, however, a high speed line is needed. In the embodiment, therefore, the terrestrial line of the specifications of 1.5 Mbps of the ISDN line is used. Such a line is an existing line and can be easily installed and used by paying a line fee of use. As will be explained hereinlater, a capacity of one electronic press information is about 20 to 30 MB and a transmitting time is 2 to 3 minutes. In case of a fee of NTT as an example, a communication fee is equal to about 1000 yens at a location within 60 km from the center (based on the NTT fee in 1995 at present).

When obtaining electronic press information by using the public telephone line 29, it is unsuitable to transmit a large amount of presses because the line is not a high speed line. In the embodiment, the small scale publishing company 15 transmits a small amount of advertisement by using the public telephone line 29 and the other electronic press information producer 20 sends a large amount of press information by using the ISDN line 28 of the specification of 1.5 Mbps.

The following two examples can be presumed as fee contracts between the publisher 10 and the electronic press producer 20 or between the electronic press producer 20 and the electronic press information distribution and sales trader 30. One is a sell-out of data and is a method whereby the electronic press information distribution and sales trader 30 pays only a fee of the original press information irrespective of the quantity of copies. The other is the number of copies sales and is a method whereby the electronic press information distribution and sales trader 30 returns the number of sales as data and pays a fee corresponding to it.

The electronic press information distribution and sales trader 30 contrarily receives an advertisement fee from the small scale publishing company 15. Those fees can be paid by a bank transfer or the like in a manner similar to the conventional method.

As another contracting method, it is also possible to use a method whereby the small scale publishing company 15 is not specified but a person who made an advertisement transmits the advertisement to both of the electronic press producer 20 and electronic press information distribution and sales trader 30 for an arbitrary time, adds an advertisement fee to the line use fee, automatically pays the total fee to the line company, and obtains the advertisement fee therefrom.

(Center)

A construction and functions of the center 32 of the distributing system will now be described with reference to FIG. 3.

[Construction of center]

Figure 3:
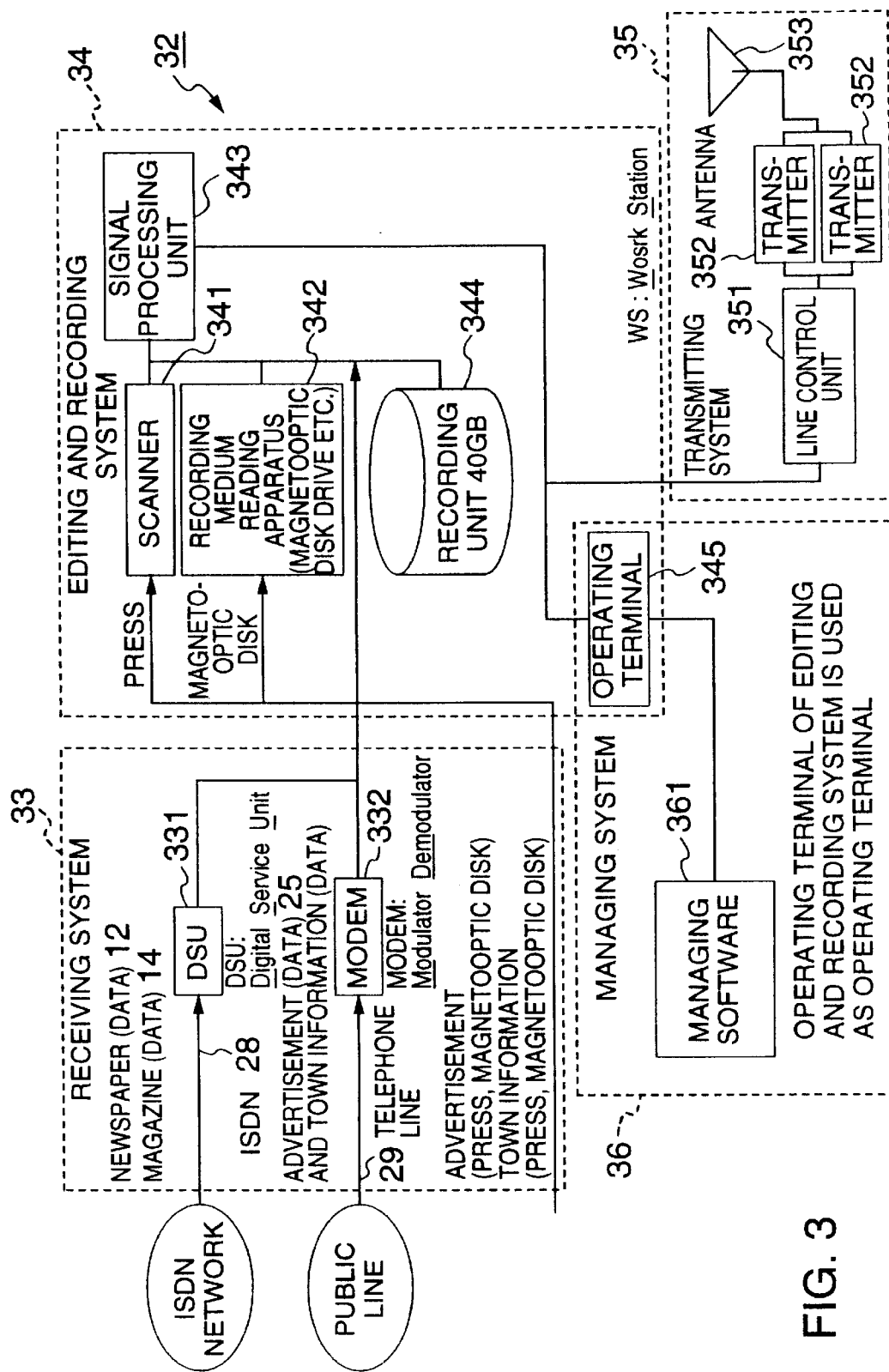
FIG. 3 is a diagram showing a construction of a center of each system of the invention.

FIG. 3 is a diagram showing a construction of each system in the center.

The center 32 is constructed by the receiving system 33, recording and editing system 34, transmitting system 35, and managing system 36.

The receiving system 33 is constructed by a DSU (Digital Service Unit) 331 connected to the ISDN network and an FAX modem 332 connected to, for example, the public line.

The recording and editing system 34 is constructed by a scanner 341, a recording medium reading apparatus 342, a signal processing unit 343, a recording unit 344 having a storage capacity of, for example, 40 GB, and a terminal for edition (operating terminal) 345.

The transmitting system 35 is constructed by a line control unit 351, a transmitter 352, and an antenna 353.

The managing system 36 is constructed by a managing software 361 and the operating terminal 345. The operating terminal of the managing system 36 and the terminal for edition of the recording and editing system 34 can be commonly used.

[Processing contents of center]

In the center 32, the electronic newspapers 22, electronic magazines 24, and electronic advertisement and town information 26 are received from a plurality of electronic press information producers 20 (including the electronic press forming system 25 of the small scale publishing company 15) and are recorded and edited to one set by the recording and editing system 34. A fee management between the center 32 and the electronic press information producers 20 and the management of the vending machines 40 are executed by the managing system 36 of the center 32.

When the electronic press information is received from the electronic press information producer 20, the digital service unit (DSU) 331 is used for the ISDN line 28 and the facsimile modem (FAXMODEM) 332 is used for the public telephone line 29. By the operation of the signal processing unit 343 of the center 32, the received electronic press information is accumulated into the recording unit 344. The advertisement and town information given by presses is read by the scanner 341 of the recording and editing system 34 and is accumulated into the recording unit 344. The advertisement and town information given by the magnetooptic disk is read by the recording medium reading apparatus 342 of the recording and editing system 34 and is accumulated into the recording unit 344.

Fundamentally, each electronic press information producer 20 transmits the data to the center 32 as press information while setting one newspaper into an independent unit and setting one magazine into an independent unit. The transmitted data is classified and recorded into the recording unit 344 in the center for every electronic press information producer.

The electronic press information which was classified every electronic press information producer has to be transmitted by dividing the line for every district when it is distributed and transmitted to each vending machine (there is also a case where such information is distributed and transmitted separately to two or more districts by one line). Therefore, the press information has to be again separated so as to be distributed and transmitted per district.

Figure 4:
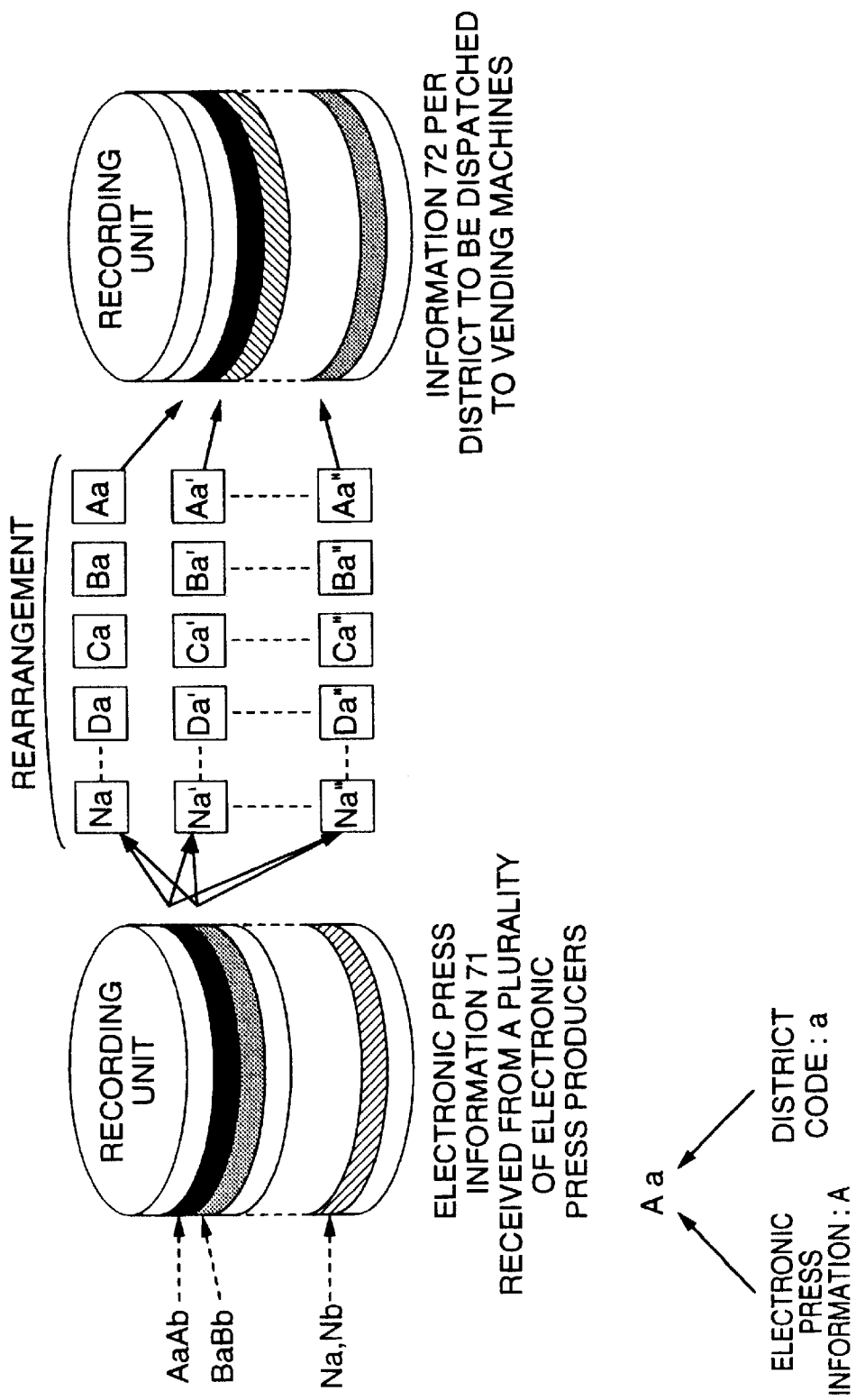
FIG. 4 is a diagram showing an editing method of the invention.

For example, as for the magazines to be commonly distributed and transmitted to the whole country, the information from all of the electronic press information producers 20 is collected to one set and is enabled to be distributed and transmitted by one line. On the other hand, in case of the newspapers, since the contents of the presses differ every district, it is necessary to edit them by a method as shown in FIG. 4. In the diagram, capital letters A, B, . . . , and N of alphabets denote different kinds of electronic press information and small letters a, b, . . . , and n of alphabets indicate district codes to which the electronic press information is distributed and transmitted.

A distribution and transmission district code can be added to electronic press information 71 which is transmitted from the electronic press producer. Namely, the district code a is added to the a district edition of an A newspaper company and the district code b is added to a b district edition of the A newspaper company. Further, the district code c is added to a c district edition of a B newspaper company. As for a newspaper to be distributed and transmitted to a certain district, the electronic press information 71 received from a plurality of electronic press information producers 21 and 22 is again arranged per district on the basis of the district codes, thereby enabling those information to be simultaneously distributed and transmitted to the vending machines by using one line as electronic press information 72 per district. Further, even in case of one press unit, the district code is similarly added and the resultant information is again arranged and can be also distributed and transmitted every district. In this instance, an editing process such as distributing and transmitting order, division of information, addition of the district code to identify the district when the information is separately distributed and transmitted to two or more districts by one line or the like. The editions are performed by the signal processing unit. As a memory capacity of the recording unit 344, it is sufficient to provide 40 GB even when considering the operations for accumulating the electronic press information as much as 300 MB for magazines, 200 MB for newspapers for 50 districts, and 10 MB for advertisement for 500 districts (total 15.3 GB) per day and for editing every district.

In addition to the electronic press information, a command distributing and transmitting procedure for a remote operation of the vending machine and a distributing and transmitting procedure of the electronic press information are determined (edition of command). Such a distributing and transmitting procedure is set to one file (called a control file). A control file is formed by the operating terminal 345. FIG. 5 shows an example of a table of such procedures. The table includes allocation information of channels or the like upon data distribution and transmission.

The managing system 36 in FIG. 3 manages a reception time, a kind of press, a name, a fee, and the like with respect to the received electronic press information. The managing system 36 also manages a reception time, a kind of press, a name, a fee, and the like, manages sales or the like, and also manages an operating situation of the vending machines with respect to the electronic press information which was distributed and transmitted.

The transmitting system 35 distributes and transmits the electronic press information to a plurality of vending machines 40 in accordance with a distributing and transmitting procedure from the managing system 36. A distributing and transmitting method will now be described.

The transmitting system 35 has a plurality of transmission channels. A transmission data recording unit is independently provided for each transmitter 352 of a channel and the electronic press information to be transmitted can be sequentially recorded in accordance with the transmitting order. The line control unit 351 reads a control file and records a command portion therein. In accordance with a transmitting procedure written there, the line control unit 351 controls the transmitter and transmission data recording unit, transmits commands, and distributes and transmits the electronic press information. The commands can be also written in a specified transmission data recording unit (of the first channel, for example). The commands will be described hereinlater.

Figure 6:
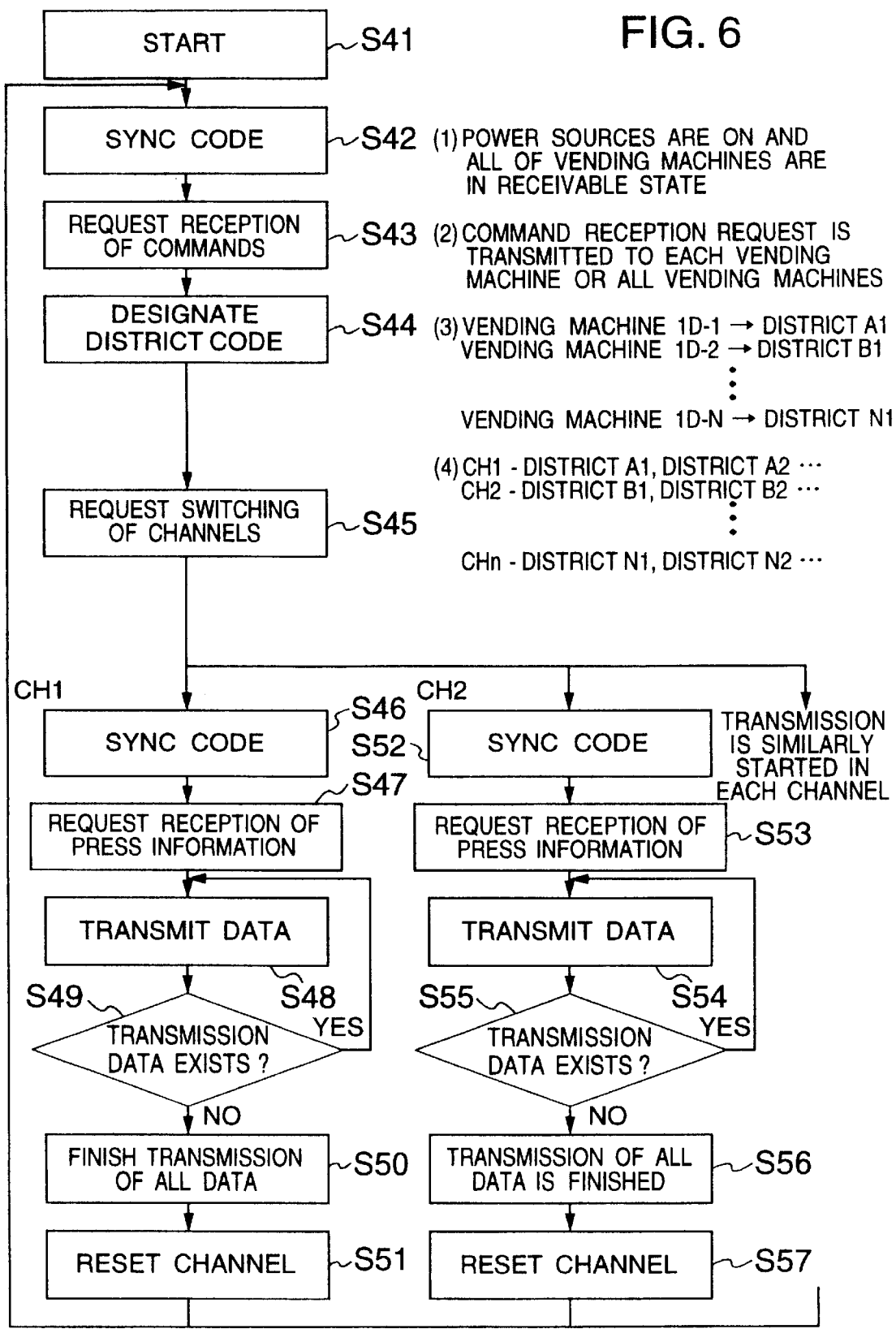
FIG. 6 is a flowchart for a transmission of commands.

FIG. 6 shows a flow for the distributing and transmitting procedure. First, a sync code is transmitted by using 1 ch (S42). As a prerequisite condition, power sources of all of the vending machines have already been turned on and the vending machines are in a receivable state. A bit synchronization, a frame synchronization, and the like are realized by the sync code signal. A command receiving request is transmitted to a specified vending machine or all of the vending machines (S43). Ordinarily, the receiving request is transmitted to all of the vending machines and district codes A1, A2, . . . , and AN are designated to the vending machines of ID=1, 2, 3, . . . , and N (S44). The command transmitting procedure until now is executed by 1 ch as a whole.

As for the data transmission, the channel 1 (CH1) is allocated to the district codes A1, A2, A3, and the channel 2 (CH2) is allocated to district codes B1, B2, B3, . . . in order to execute parallel processes, and after that, a channel switching request is generated and the channels are separated (S45). Since the number of channels is limited, one channel corresponds to a plurality of districts.

As a separating method, first, the sync code is transmitted to each channel (S46, S52) and, subsequently, a switching destination channel is designated in a press information receiving request (S47, S53), thereby separating. After the channels were separated, the data transmission is performed (S48, S54). Each channel checks to see if the transmission of all of the data has been finished (S49, S55). After completion of the transmission of all data (S50, S56), a channel resetting request (S51, S57) is received and the processing routine is returned to 1 ch.

Figure 7:
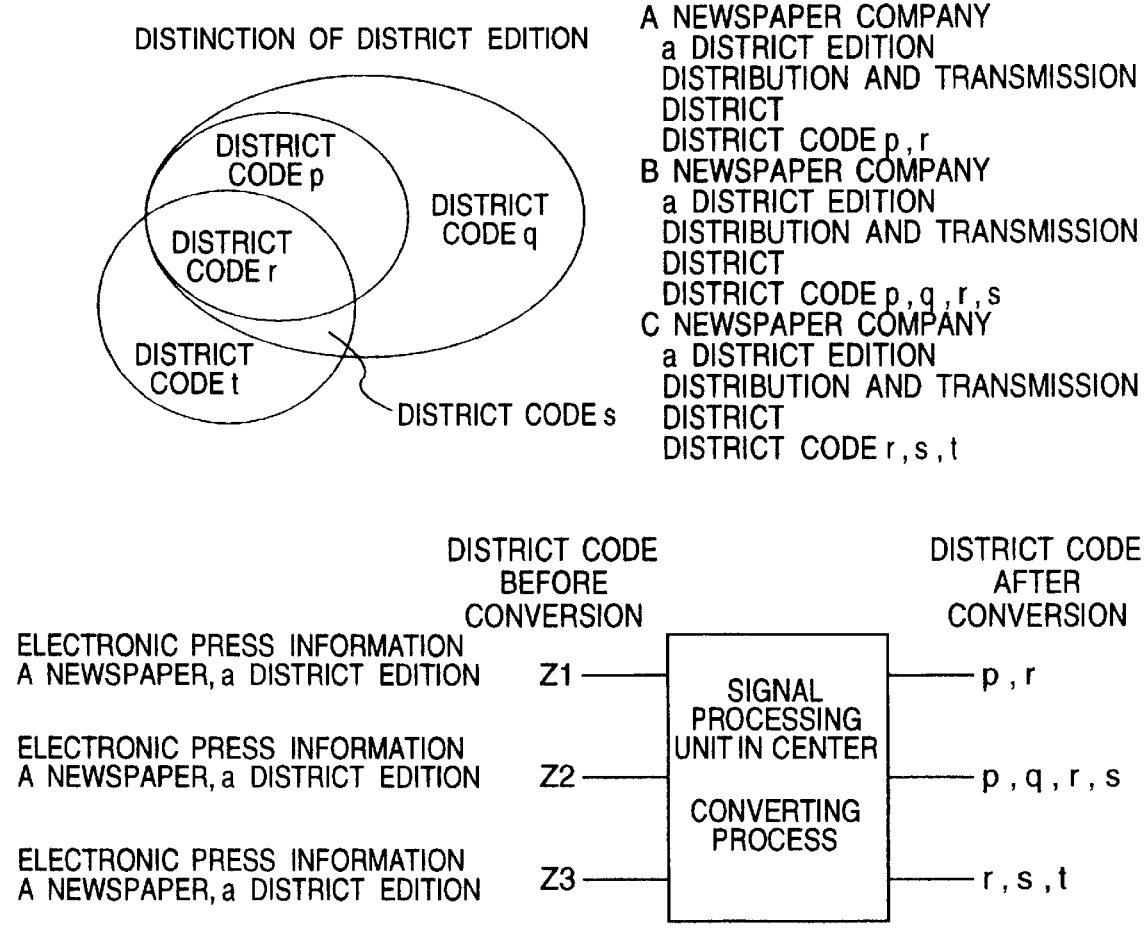
FIG. 7 is a diagram showing a distributing and transmitting method.

There is a case where the distinction of the distribution and transmission district of a district edition differs depending on the newspaper company. FIG. 7 shows a distributing and transmitting method in such a case. Three editions of an (a) district edition of an A newspaper company, an (a) district edition of a B newspaper company, and an (a) district edition of a C newspaper company are transmitted to the center from the electronic press producer. The distribution and transmission district of the (a) district edition of the A newspaper company corresponds to district codes (p, r) added to the vending machines. The distribution and transmission district of the (a) district edition of the B newspaper company corresponds to district codes (p, q, r, s)) added to the vending machines. The distribution and transmission district of the (a) district edition of the C newspaper company corresponds to district codes (r, s, t) added to the vending machines. In the signal processing unit of the center, by converting the district code into the district code which corresponds to the ID of the vending machine in a one-to-one corresponding relation, so that the district edition can be distributed and transmitted to a desired district. Similarly, even when a specified district code Z1 is designated in place of the (a) district edition of the A newspaper company and a specified district code Z2 is designated in place of the (a) district edition of the B newspaper company and a specified district code Z3 is designated in place of the (a) district edition of the C newspaper company, the specified district code can be converted into the district code which corresponds to the ID of the vending machine in a one-to-one corresponding relation in the signal processing unit of the center.

(Distributing and transmitting method of electronic press information)

The method of distributing and transmitting the electronic press information from the center to the vending machines installed in each district can be decided by examining trade-off items about the broadcast communication and individual communication, the one-way communication and two-way communication, and the line per district and terrestrial line per contents of the press.

The broadcast communication and the individual communication will be first compared.

This method is mainly classified into the following three methods: (1) method of transmitting the press information of all districts by the broadcast communication and selecting on the reception side; (2) method of transmitting only common press information by the broadcast communication and transmitting press information having district characteristics by the individual communication; and (3) method of transmitting all of the press information by the individual communication. The satellite communication is often used for the broadcast communication. The ISDN is often used for the individual communication. A proper method is decided on the basis of the communication fees of those lines or the like.

Namely, according to a current available charge in Japan, since a fee of one transponder (36 MHz, 30 Mbps) is equal to 600 yens/h and 20 lines of 1.5 Mbps enter one transponder, a fee of the satellite communication is equal to 30 yens k/(h Å line). According to the ISDN, since a communication fee in a district as a least fee is equal to 60 yens/50 seconds, 1.5 Mbps and a fee of one transponder is 4.32 yens k/(h Å line). Therefore, the fee of the satellite communication is 6.9 times as high as that of the ISDN. If the same contents are received by seven or more vending machines, accordingly, the fee of the satellite communication is cheaper. In the present distribution and transmission, since the number of reception points (the number of vending machines) to receive the electronic press information of the same contents is set to 7 or more (10 for advertisements, 100 for newspapers), the fee by the satellite communication for the broadcast communication is cheaper.

The one-way communication and the two-way communication will now be compared.

In dependence on whether management data is transmitted from the vending machines to the center or the service person circulates and obtains the management data, the necessity of the line directing from each vending machine to the center is determined. To execute such a procedure by the satellite communication, a two-way communication satellite is needed. In such a case, the system becomes a complicated and expensive system because a license of a transmitting station is necessary for the vending machine having the transmitting and receiving function or the like. As another measure, a method of using the ISDN (for example, packets of ISDN 64 kbps) for an up-line is also considered.

According to the embodiment, however, the following description is made as a one-way communication from the center such that only one way of the satellite line is used as a line for the broadcast distribution and transmission, the electronic press information and the commands are transmitted to the vending machines by the above communication, and the service person circulates and obtains the management data.

The line per district and the terrestrial line per contents of the press will now be compared.

Since the contents of the information of a newspaper and an advertisement have strong district characteristics, press information which is received by the vending machines differ every district. Therefore, when considering on the assumption mentioned before, the information of magazine of 300 MB (26 minutes and 40 seconds at 1.5 Mbps) is commonly distributed and transmitted to all of the districts everyday, the information of newspaper of 200 MB (17 minutes and 47 seconds at 1.5 Mbps) is distributed and transmitted to about 50 districts, and the information of advertisement of 10 MB (53 seconds at 1.5 Mbps) is distributed and transmitted to about 500 districts, respectively. Actually, since the time zone for distribution and transmission of the newspaper or the like is limited, it is predicted that the system is operated for about one hour×two times per day.

As a distributing and transmitting method, there are two methods: (1) method (line per district) whereby a terrestrial line (radio wave) is allocated in accordance with the district and the information is simultaneously distributed and transmitted; and (2) method (line per press) whereby a terrestrial line (radio wave) is allocated in accordance with the press and the information is simultaneously distributed and transmitted. When using the method (1), one line (26 minutes and 40 seconds at 1.5 Mbps) is needed every publishing company for magazine, about 50 lines (17 minutes and 47 seconds at 1.5 Mbps) are needed for newspaper because it is separately distributed and transmitted to 50 districts, and about 500 lines (53 seconds at 1.5 Mbps) for advertisement because it is further finely divided and is separately distributed and transmitted to 500 districts. In case of using the method of (2), the information of magazines of a few companies is collectively sent to one line (26 minutes and 40 seconds at 1.5 Mbps). About ten lines (one hour, 28 minutes, and 55 seconds at 1.5 Mbps) are used to transmit information by assuming that there are about ten newspapers. The information of advertisement is collectively transmitted to one line (55 minutes and 33 seconds at 1.5 Mbps).

According to the above method (1), in order to receive the information of the district where the vending machine is installed, it is sufficient that the vending machine has a function to simultaneously receive the information of magazine, newspaper, and advertisement every line. However, according to the method of (2), in order to simultaneously receive the line data of a plurality of companies, a function to receive a plurality of lines is needed. According to the method of (2), one vending machine has a communication capability of receiving the time is divided and the information is transmitted information from a plurality of lines. As a countermeasure for such a line division, there is considered a method whereby the system has a communicating function such that one vending machine can receive information of a plurality of lines, a method whereby a vending machine for exclusively receiving one line in the same district is installed and the data received mutually is exchanged, or the like. However, any one of the above methods has a complicated construction.

In the embodiment, therefore, the method of (1) is used as a principle. However, although a use fee of the transponder of the satellite is determined by the use time, the minimum unit is set to, for example, 5 minutes and it is not economical to frequently use the system in a short time. Therefore, a distributing and transmitting method such that the use time continues for one hour is needed. To continue the use time, all of the press information of different districts is not transmitted by different lines but are collected to a certain degree and are transmitted by one line while shifting the time. When collectively distributing and transmitting the data, district designation information or vending machine ID information is included in a part (near the head) of the data, thereby enabling only a specified district or a specified vending machine to record the reception data. With this method, the newspaper and advertisement can be transmitted by 20 lines (one transponder).

[Transmitting command from center]

Commands which are transmitted from the center and a remote operation will now be described. First, as a prerequisite of the remote operation, there are the following seven prerequisites. (1) A power source of the vending machine is ON and the vending machine is in a receivable state. (2) Although a vending machine ID has been determined, the district code can be changed. (3) A target of the remote operation is set to a process after descrambling. (4) 1 ch (the first channel) is received unless otherwise designated. (5) All of the commands are transmitted by 1 ch. (6) There is a relation between the district and the channel such that one certain channel corresponds to a plurality of districts and such a channel has been predetermined. (7) There is also a case where information is distributed and transmitted to two or more districts by one channel and the district and the channel don't correspond to each other in a one-to-one corresponding relation.

There are the following commands. The contents shown in ( ) indicate information which is transmitted by the command.

(1) Head signal: (sync code)

To connect the line, a bit synchronization, a frame synchronization, and the like are established.

(2) Command receiving request: (target vending machine ID (ordinarily, all of the vending machines are used as targets))

Indicates that the command is sent from now on.

(3) Designation of district code: (vending machine ID, district code)

The district code is allocated to each vending machine.

(4) Channel switching request: (district code, channel number)

A channel switching destination is designated and a channel switching is requested.

(5) Press information receiving request: (district code, press information ID, press information)

Indicates that the press information is distributed and transmitted from now on. A file name of the press information is also included in the press information ID.

(6) End of transmission

Indicates that the distribution and transmission of the press information were finished.

(7) Channel resetting request

Requests so as to switch to the channel 1 ch. Even if a channel reset requesting command is not transmitted, when no command is received for a little while, the receiving channel is returned to 1 ch.

(8) Data transferring request between vending machines: (data transferring source vending machine ID)

By using an LAN installed among the vending machines, it is requested to transfer press information or the like from the vending machine having a press information receiving function to the vending machine which is connected by the LAN and doesn't have the press information receiving function.

(Vending machine)

An outline of the vending machine 40 in FIG. 3 will be first described.

When the purchaser purchases the electronic press information by the vending machine 40, the information is recorded to a recording medium 52 (magnetooptic disk, IC memory, etc.) and the purchaser uses it by a portable display terminal. The information recorded on the recording medium can be also used by a personal computer or the like installed in a home. A number of such vending machines are installed in a station, on a street, and the like.

With respect to each of the newspaper, magazine, advertisement, town information paper, and the like, 100 or more kinds of such media including the new edition and old editions have been stored in the vending machine of the system. The purchaser can purchase a desired article by a simple operation and in a waiting time which are similar to those of the conventional vending machine. The vending machine can be accessed for 24 hours. A fee is paid in cash or by a prepaid card or the like.

The vending machine has a function to display a part, a cover, or the like of a newspaper or a magazine. The consumer (purchaser) watches the part or cover of the first page of the newspaper or magazine which was displayed, decides a desired article, inserts an IC memory card as a recording medium into the vending machine, inserts cash, a prepaid card, or the like, and pushes a button of the newspaper or magazine to be purchased. The purchaser purchases electronic press information by a procedure such that he receives the IC memory card on which the press information has been recorded and a change or the prepaid card is returned.

[Construction of vending machine]

Figure 8:
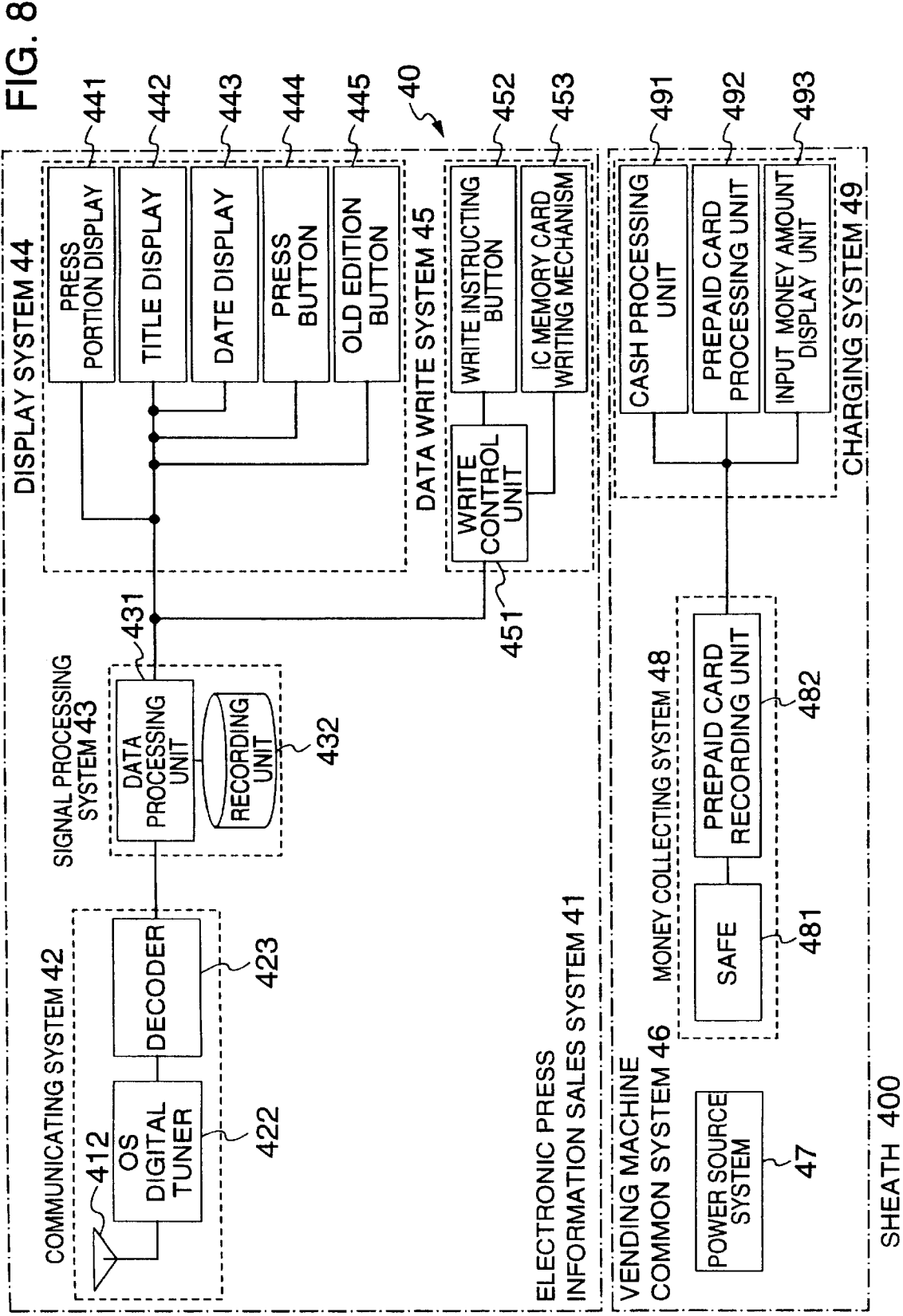
FIG. 8 is a system constructional diagram (vending machine) of the invention.

FIG. 8 shows a construction of the vending machine. Systems of the vending machine 40 which are used in the electronic press information distributing and transmitting system according to the invention are mainly divided into: an electronic press information sales system 41 comprising structural features of the invention; and a common system 46 which is common to the conventional vending machine. The electronic press information sales system 41 is constructed by a communicating system 42, a signal processing system 43, a displaying system 44, and a data writing system 45.

A function of each section will now be described. The electronic press information is received by an antenna 421 of the communicating system 42 and is supplied to a CS digital tuner 422. After a demodulation, a bit synchronization, a frame synchronization, an error correction, and the like were performed in the tuner 422, the data is stored into the buffer memory on a unit basis of a few frames. When the buffer memory is full of data, a memory full signal is outputted.

A decoder 423 fetches the data at a timing in response to the memory full signal. Since the data has been scrambled, it is descrambled by a descrambler in the decoder.

In the signal processing system 43, a data processing unit 431 sets the data from the decoder 423 to one file on a unit basis of one press information (for example, one newspaper) and is recorded into a recording unit 432. The recording unit 432 is a magnetic disk or the like.

Figure 9:
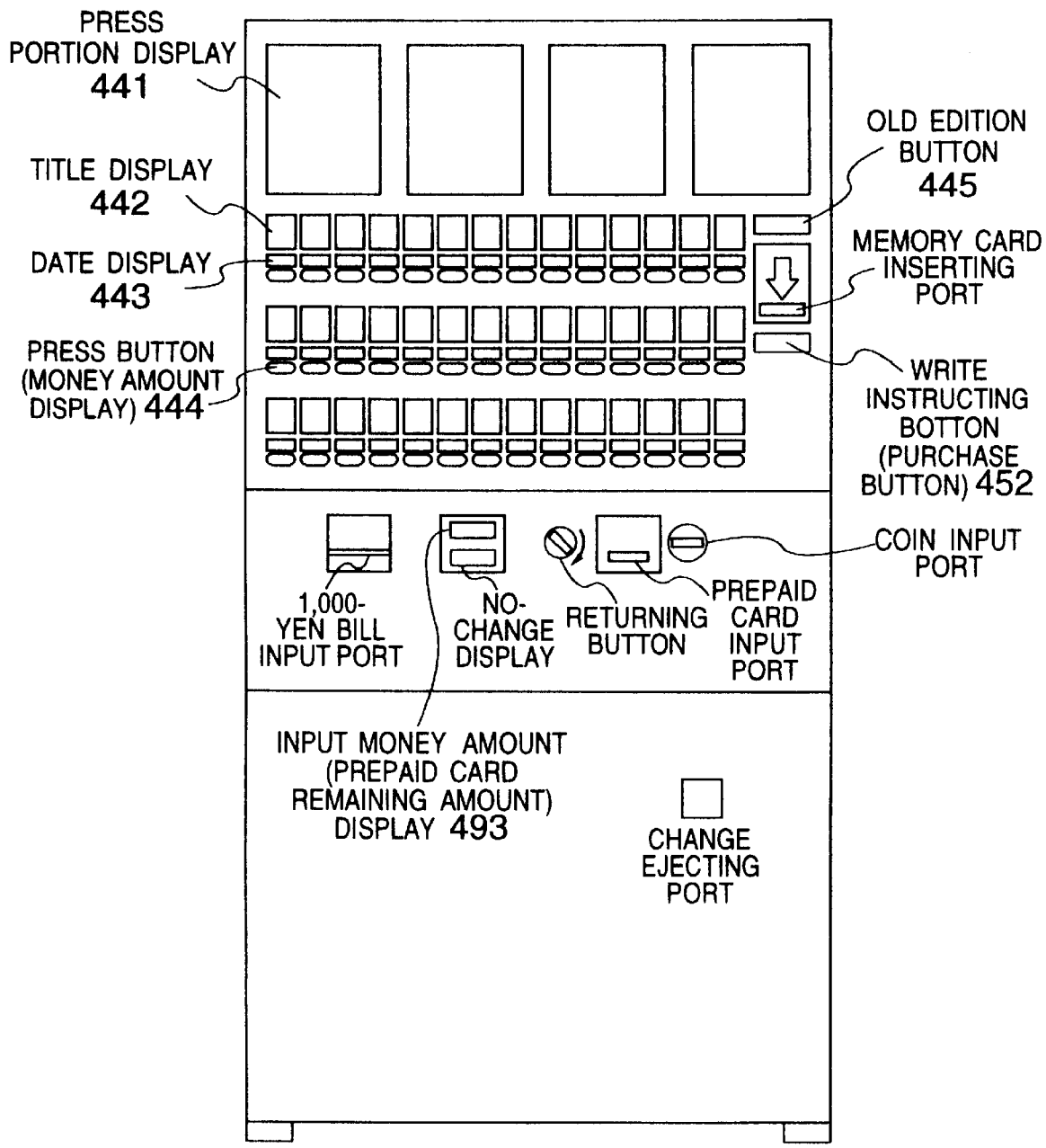
FIG. 9 is a diagram showing an outline of a front side of a sheath of the invention.

Each display and buttons of the displaying system 44 are all arranged on the front side of a sheath. FIG. 9 shows a schematic diagram of the front side of the sheath. On the front side, there are provided: one or a plurality of press portion displays 441 also shown in FIG. 8; about 40 sets each comprising a title display 442, a date display 443, and a press button 444; an old edition button 445; a write instructing button 452; and the like. There are also provided: an IC memory card inserting port as a part of an IC memory card writing mechanism 453; a cash inserting port and a no-change display unit as a part of a cash processing unit; and a prepaid card inserting port as a part of a prepaid card processing unit. By depressing the press button 444, the consumer can display a part of the press displayed on the title display 442 onto the press portion display 441. A part of the press is a cover of the magazine or a part of right upper ¼ of the first page of the newspaper. The selected press button is lit on.

As a press portion display 441, a liquid crystal panel of 7 inches or more having (640×480) pixels, a CRT of 7 inches or larger, or the like is used. In case of the CRT, the number of pixels can be set to (640×480) or an NTSC system which is used in a television broadcast can be also used. Although large characters such as a headline or the like of a press need to be seen on the picture plane, it is rather better that fine characters are broken. It is better to set the number of pixels to a value within a range from ½ to about two times of the above pixel number. A large screen size is better.

When the vending machine has a plurality of press portion displays 441, parts of the press are displayed in accordance with the depressing order of the press button 444. In a state in which a part or a cover of the newspaper or magazine is displayed on all of the displays, when a display of further another press button 444 is requested, the oldest display is deleted and the relevant press is displayed. The display contents of the other displays are not changed.

When the press button 444 is not depressed for a little while (for example, one minute or more), the display contents are automatically updated. After completion of the updating, for example, a set press is displayed. Or, an advertisement, news, or the like is displayed. The display contents can be also automatically updated at a certain predetermined time interval. As for the advertisement, news, or the like to be automatically displayed, by displaying a digest of the presses which are sold by the vending machine, a purchasing will can be enhanced.

The title display 442 shows the titles of the latest editions of all kinds of newspapers, magazines, and advertisements stored in the vending machine. The date display 443 displays the date (including the distinction of the morning edition and evening edition of the newspaper). The price is also displayed on the press button 444. When the old edition button 445 is depressed, a one-old edition (assuming that the latest edition is the evening edition, the morning edition of the day) is displayed on the display on which the newspaper or magazine shown by the press button 444 depressed at last has been displayed. Each time the old edition button 445 is depressed, the edition that is old one edition by one is displayed. To again display the latest edition, the press button 444 is pressed. In a state in which the oldest edition is displayed, when the old edition button 445 is further pressed, a message indicating "No more older edition" is displayed on the edition displayed at present by the title display 442. The date shown on the date display 443 is changed in accordance with the old edition.

Figure 10:
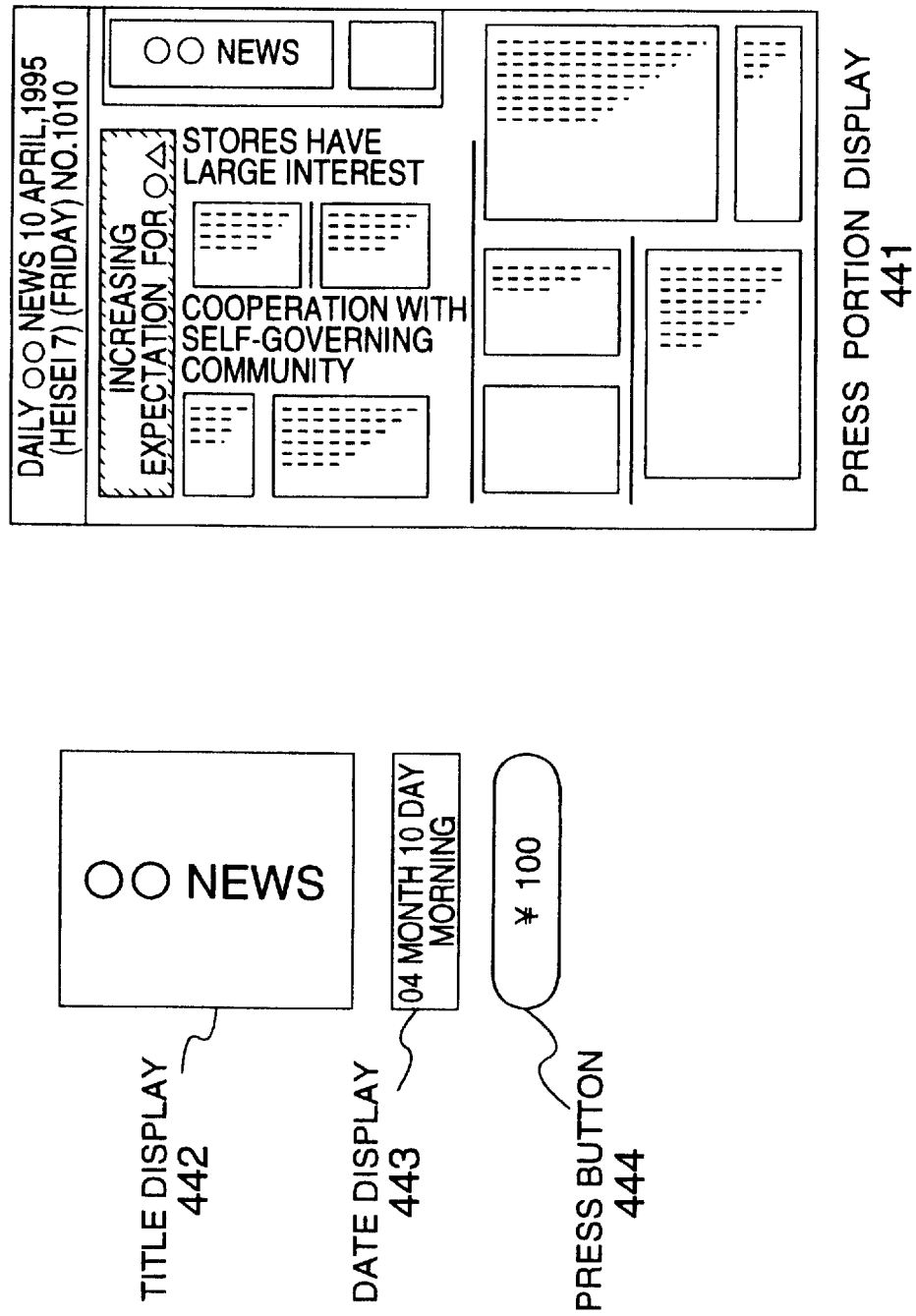
FIG. 10 is a diagram showing a construction of a display example of each display and a press button of the invention.

Although an LED can be used as a title display 442, the titles can be also displayed by a printed matter such as a paper or the like. FIG. 10 shows a display example of each display and press buttons. It is assumed that the date display 442 can instantaneously change the display contents by an LED or LCD. Messages such as "xx month ΔΔ day □□" (□□ . . . morning (morning edition), evening (evening edition), Vol., or the like) or the like are shown in this instance.

A write control unit 451 and the IC memory card writing mechanism 453 of the data writing system 45 record the electronic press information to the recording medium 52 (IC memory or the like) which is inserted by the consumer.

The vending machine common system 46 will now be described. A charging system 49, a money charging system 48, and a power source system 47 are similar to those which have already been realized by the existing vending machine and will be simply explained here.

A cash processing unit 491 of the charging system 49 discriminates the inserted cash and outputs a change as necessary. When there is no change, no-change display unit is lit on. A prepaid card processing unit 492 discriminates a remaining amount of the inserted prepaid card. When a purchase button is depressed, the remaining amount of the prepaid card is reduced and rewritten by the amount corresponding to the purchase amount of money. If the remaining amount becomes a minus value, the electronic press information is not written but the prepaid card and IC memory card are returned. A lack of remaining amount of the prepaid card can be also replaced by the insertion of cash.

An input money amount (remaining amount of the prepaid card) displaying unit 493 displays an amount of input money or a remaining amount of the prepaid card. A safe 481 of the charging system 48 stores the input cash. A prepaid card data recording unit 482 records a sales by the prepaid card. The power source system 47 converts a commercially available power source of 100 ACV or 200 ACV into a DC voltage which is used therein.

Figure 11:
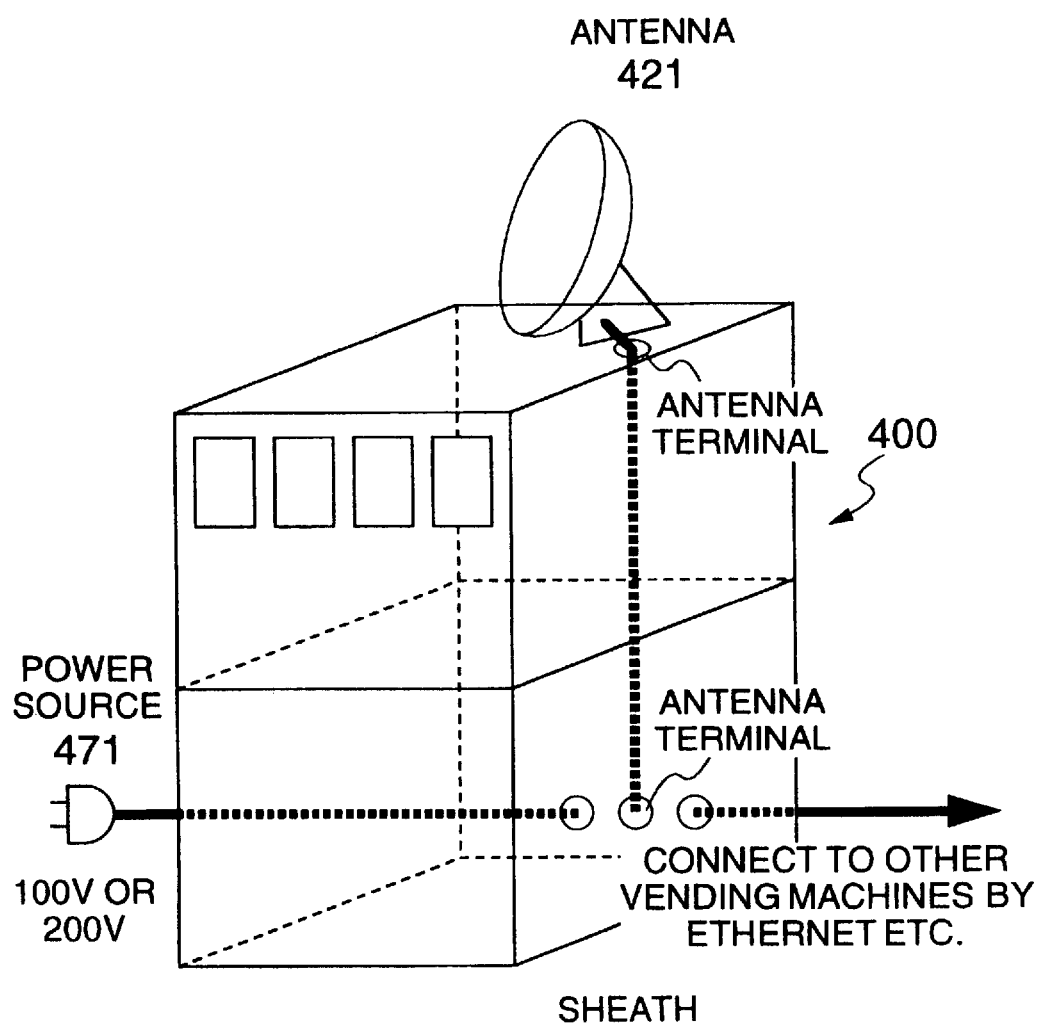
FIG. 11 is a diagram showing an outline of the sheath of the invention.

FIG. 11 shows an outline of the sheath. The front side has already described above.

A power source cord 471, a terminal (for example, Ethernet) for a local area network, and an antenna terminal are provided on the rear side. The antenna 421 for communication can be mechanically attached to the upper surface. There is also an antenna terminal on the upper surface.

However, there is a case where the antenna is attached to a remote position where the vending machine is installed. Although the vending machine serving as a host of the LAN connecting the vending machines has an antenna terminal and an antenna, the vending machine which receives the press information from the host doesn't have an antenna and the antenna terminal is closed or the like.

An internal structure is such that the electronic press information sales system 41 is enclosed as a unit into the vending machine common system 46 including a sheath 400. The electronic press information sales system 41 executes a display of the front side, a transmission and a reception of signals to/from the buttons, and a transmission and reception of signals to/from the vending machine common system 46 by connecting a connector.

[Amount of data which is stored into vending machine and data reception time]

An amount of data which is stored into the vending machine is set as follows in consideration of that the new edition is immediately updated and, for example, in case of the magazine, the old edition of about one week before can be also bought. Namely, in case of the newspaper, a data amount of both of the morning edition and evening edition of one day is equal to 20 MB/unit (unit: morning edition+ evening edition). A data amount of ten units (papers) as much as five days including the old editions, respectively, is stored. In case of the magazine, since it has a data amount of 30 MB/magazine, a data amount of 100 magazines is stored. Thus, a total data amount is estimated to be 4 GB. Therefore, it is necessary to set the capacity of the recording unit (magnetic disk) to 4 GB or more.

It is estimated that an amount of data to be updated in a day is equal to 500 MB as a whole by assuming that a data amount of ten units (morning edition+evening edition) of newspapers is equal to 200 MB and a data amount of 10 magazines is equal to 300 MB. Therefore, when transmitting at a rate of 1.5 Mbps, the data reception time is equal to 17 minutes and 47 seconds for the newspapers and to 26 minutes and 40 seconds for the magazines, so that the total time of 44 minutes and 27 seconds is needed. The number of advertisements is predicted to be 10 MB when there are 100 advertisements of the A4 size. To transmit such advertisements at 1.5 Mbps, 53 seconds are necessary.

[Operating method of vending machine]

Figure 12:
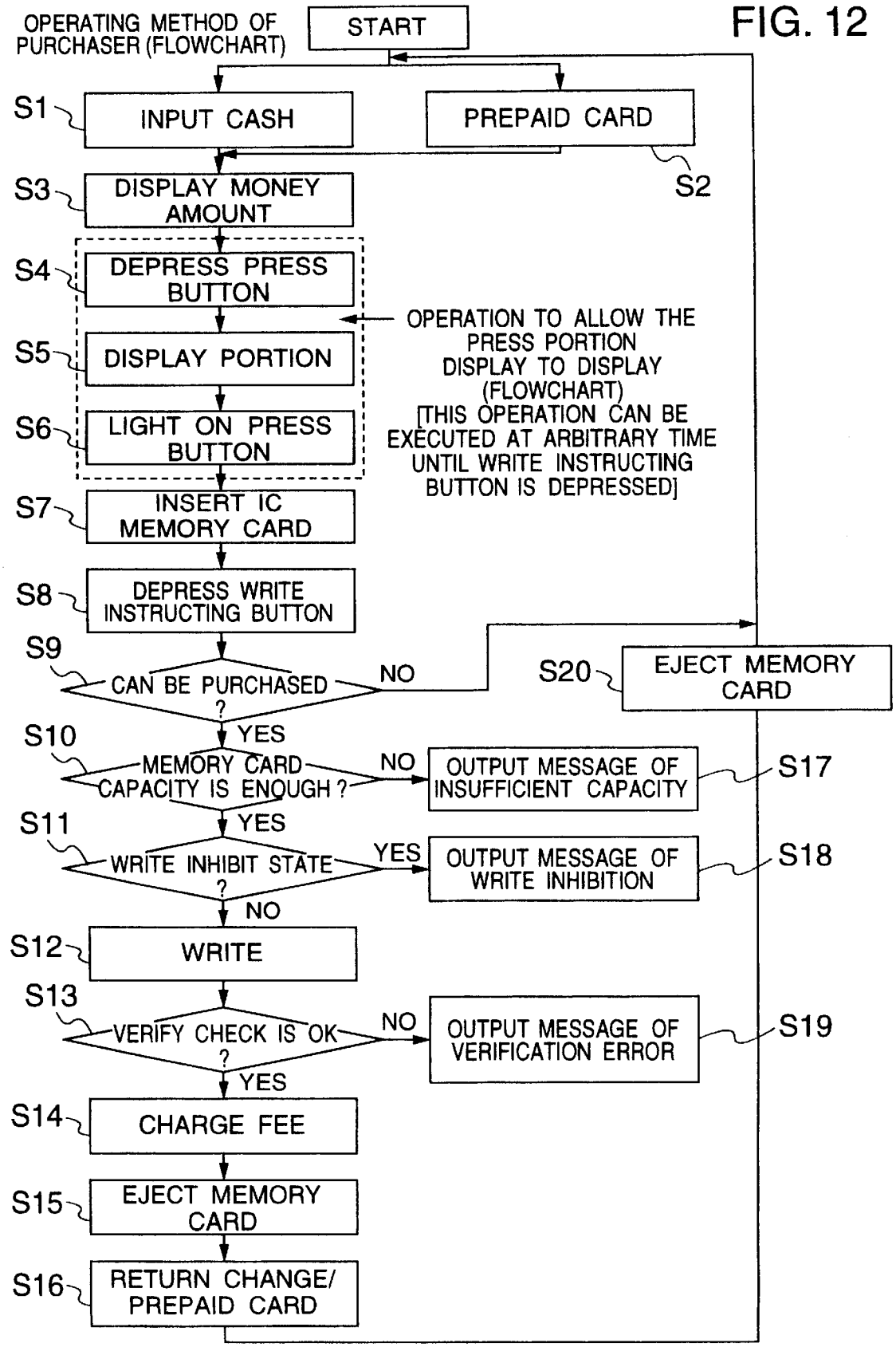
FIG. 12 is an operation flowchart of the invention.

An operating method of the purchaser will now be described with reference to an operation flowchart of FIG. 12.

One unit of the newspaper or the like can be displayed on the press portion display at any time for a period of time until the write instructing button is depressed irrespective of a timing before money is inputted or after it was inputted. However, in general, an example of the operating method of the purchaser is shown on the assumption that after the purchaser selected a desired press of the newspaper or the like to be purchased after the money had been inputted, an operation is performed just before the write instructing button is depressed.

[Operating method of purchaser]

First, the purchaser inputs cash or a prepaid card (S1, S2). The vending machine confirms the input money amount and displays the input money amount (remaining amount in case of the prepaid card) (S3). The purchaser selects a desired press of the newspaper or magazine by pressing the press button (S4). The vending machine displays a part of the selected title display press by the press portion display (S5) and lights on the press button (S6). The purchaser inserts the IC memory card (S7) and presses the write instructing button (S8). The vending machine judges whether the relevant press can be purchased by the cash or the money amount of the inserted prepaid card or not (S9).

The vending machine confirms that the IC memory card has legally been inserted, displays its fact, and discriminates whether a capacity to record the selected press remains in the memory card or not (S10). When there is an enough residual amount in step S10, a check is made to see if the IC card is in a write inhibition state (S11). When the IC card is in a writable state, the data of the selected press is written into the IC memory card (S12). After completion of the writing, a check for verification (collation of the contents of the written data) or the like is executed, thereby confirming whether the writing has normally been finished (S13). When it is judged in step S13 that the writing has normally been finished, the memory card is ejected (S15). A change is calculated or a remaining amount of the prepaid card is updated and the change or prepaid card is returned (S16). For a period of time in steps S5 to S14, the light-on of the title of the selected newspaper or magazine and the press portion display are continued.

In step S9, when the input money amount is insufficient, the system is not operated but waits for the input of the additional fee or the selection of another press button. When the capacity of the IC memory card lacks in step S10, an insufficient capacity message of the contents indicating "Recording medium capacity is insufficient" is outputted by a voice or the like (S17). The cash or prepaid card is returned and the processing routine is finished. Similarly, when the IC memory card is in a write inhibition state in step S11, a message such as "This IC memory card is in write inhibition" or the like is outputted (S18). The memory card is ejected, the cash or prepaid card is returned, and the processing routine is finished. In step S13, when the writing is not normally finished as a result of the verification check, a verification error message is outputted (S19). The memory card is ejected, the cash or prepaid card is returned, and the processing routine is finished. When the writing is normally finished as a result of the verification check, the fee is collected (S14), a change or prepaid card is returned, and the memory card is subsequently taken out. All of the processes are finished.

It is desirable that a waiting time until the IC memory card is ejected after the purchaser pressed the purchase button (write instructing button) is set to 5 seconds or less. Therefore, a data transfer amount of one time to be written into the IC memory card is presumed to be about 20 MB and a write data transfer speed is set to 10 MB/sec(typ.). Such a speed can be accomplished by setting a data transfer speed of the magnetic disk of the recording unit to 10 MB/sec (typ.).

Although the vending machine reads out the inserted IC memory card and performs the verification check, it doesn't guarantee that the IC memory card can be read by the terminal of the purchaser. When the recording is finished and the IC memory card is ejected, the vending machine charges. When the operation is cancelled before such a timing, the vending machine doesn't charge.

[Money collection and installation]

As a method of collecting money from each vending machine, a method whereby a service person circulates each vending machine and collects the money together with the execution of a maintenance or the like.

When the vending machine is installed in a station, on a street, or the like, the following works are executed. First, the antenna is pointed in such a direction that a satellite line can be connected. Subsequently, the reception of a radio wave from the center is confirmed. In this instance, it is also considered that the service person communicates with the center by a portable telephone or the like. By the remote operation from the center, it is confirmed that data is certainly transferred from the vending machine having the function to receive press information to the vending machine having no receiving function via the LAN. Finally, cash or a prepaid card is inserted and a check is made to see if a recording function and a fee collecting function normally operate.

[Outline of reception by portable terminal]

The method of purchasing the electronic press information by inserting the IC card or the like to the vending machine installed in a station or on a street has been described above. However, it is also possible to construct in a manner such that the consumer makes a contract with the electronic press information distribution and sales trader and prepares a specified portable terminal, thereby communicating with the vending machine via a radio, and the consumer can record electronic press information of the newspaper, magazine, advertisement, town information paper, or the like recorded in the vending machine onto the recording medium 52 (magnetooptic disk, IC memory, or the like) of the portable terminal 51 and can use it. For this purpose, a radio transceiver is provided for each of the vending machine 40 and portable terminal 51, thereby enabling a two-way communication.

(Outline of reception at general home)

The reception in a general home, a business office, or the like will now be described.

To receive electronic press information in a general home, the consumer makes a contract with the electronic press information distribution and sales trader and prepares a receiving terminal, thereby recording the electronic press information of newspaper, magazine, advertisement, town information paper, or the like which are distributed and transmitted twice a day toward the vending machine to the recording medium 52 (magnetooptic disk, IC memory, or the like), and the consumer can also use the information by a portable display terminal or a television, personal computer, or the like put in a home.

A home-use receiving terminal 90 records all of the received electronic press information to the recording unit in principle. A fee is charged when the consumer writes the information to the recording medium 52 and uses. The terminal 90 is constructed so that the electronic press information cannot be used until it is written to the recording medium 52. The home-use receiving terminal 90 is rented from the center.

In the reception at the general home, the press information is fundamentally distributed and transmitted per district by the district code to the district of the home in which the home-use receiving terminal 90 is installed. However, the consumer can select and set a desired press by the district code and a channel and a time or by merely a press ID. Therefore, the electronic press information distribution and sales trader distributes a program table (showing information such as press, district code, press name, etc. by the channel and time) to the consumer.

The turn-on of the power source and the receiving operation other than the above setting are handled in a manner similar to the vending machine and are executed by the remote operation from the center.

[Construction of home-use receiving terminal for general home]

Figure 13:
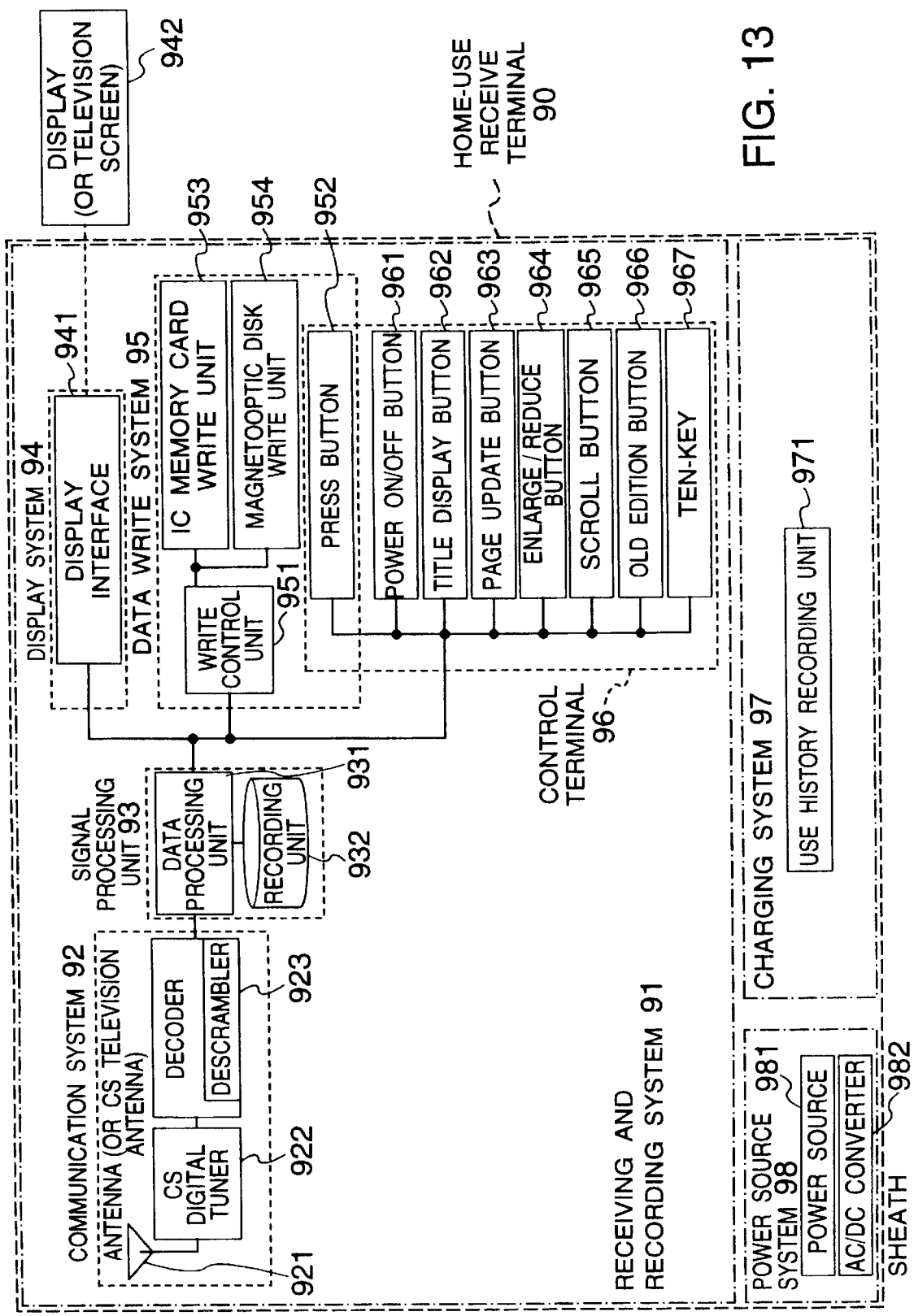
FIG. 13 is a diagram of a home-use receiving terminal of the invention.

An outline of a construction of the receiving terminal for a general home will now be described hereinbelow with reference to FIG. 13. The system is mainly separated into a receiving and recording system 91 (which is possessed by the consumer), a charging system 97, a power source system 98, and a sheath. The receiving and recording system 91 is constructed by a communicating system 92, a signal processing system 93, a displaying system 94, a data writing system 95, and a control terminal system 96. The charging system 97 has a use history recording unit 971. The power source system 98 is constructed by a power source 981 and an AC/DC converter 982. The communicating system 92 is constructed by an antenna 921, a CS digital tuner 922, and a decoder 923. An antenna for a CS television can be also used as an antenna 921.

The signal processing system 93 is constructed by a data processing unit 931 and a recording unit 932. In the displaying system 94, a display interface 941 is provided for the apparatus. A display 943 of the displaying system 94 is attached to the outside and, for instance, a home television receiver is used.

A data writing system 95 is constructed by a write control unit 951, a press button 952, an IC memory card writing unit 953, and a magnetooptic disk writing unit 954.

Figure 14:
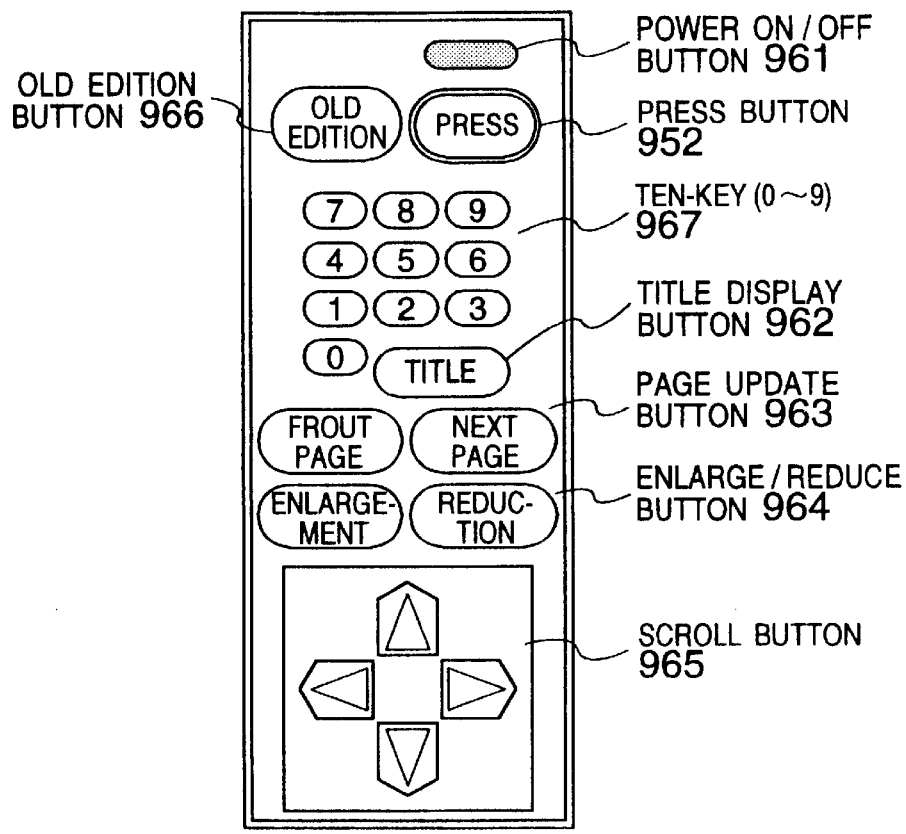
FIG. 14 is a diagram showing buttons of the home-use receiving terminal and their arrangement of the invention.

FIG. 14 shows buttons of the control terminal 96 and their arrangement. The press button 952 of the data writing system 95, a power on/off button 961, a title display button 962, a page updating button 963, an enlarging/reducing button 964, a scroll button 965, an old edition button 966, and ten-key buttons (0–9) 967 are arranged on the control terminal 96.

A function of each section will now be described. The electronic press information (data rate 1.5 Mbps) is received by the antenna 921 of the communicating system 92 and is supplied to the CS digital tuner 922. A demodulation, a bit synchronization, a frame synchronization, an error correction, and the like are executed here. After that, the resultant information is outputted to the decoder 923. Since the fetched data has been scrambled, the decoder descrambles it by a descrambler provided in the decoder and supplies to the signal processing system 93. The data processing unit 931 of the signal processing system 93 records the data from the decoder 923 to the recording unit 932 by setting one press information unit (for example, a piece of newspaper) into one file. The recording unit 932 is constructed by the magnetic disk or the like.

[Operating method and display]

The consumer turns on the power source of the home-use receiving terminal 90, performs an initial setting of a press by the district code, channel, and time or an initial setting of merely a press ID or the like as necessary, and presses the title display button 962 of the control terminal 96 after that, thereby displaying the titles onto the display 942. One of the displayed titles is selected by a number by using the ten-key 967 and presses a selecting button (not shown), thereby enabling a part of the press to be displayed by the display 942. In this instance, the title display on the display disappears.

A part of the press can be a display of the magazine or a portion of right upper ¼ of the first page of the newspaper. Although large characters such as a headline or the like of the press need to be seen on the picture plane, it is rather better that fine characters are broken and it is possible to prevent that the display is enlarged to a size more than that or that another portion can be selected. When it is desired to select another press, by pressing the title display button 962, the titles are again displayed.

When the press button 952 is not pressed for a little while (for example, one minute or longer), a preset press is displayed or an advertisement, news, or the like is displayed. It is also considered to automatically update the display contents at every predetermined time interval (for example, one minute). The advertisement, news, or the like may be a digest of presses which are sold by the vending machine or the like.

When displaying the titles, the titles of the latest edition of all kinds of newspapers, magazines, and advertisements stored in the home-use receiving terminal 90, dates (including a distinction of the morning edition and evening edition of the newspaper), and price are displayed. When they cannot be displayed in one picture plane all together, they are displayed on two or more picture planes and the presence of the next page is displayed at a lower corner of the picture plane. When it is desired to see the next page, an after-page button of the page updating button 963 of the control terminal is depressed. When it is desired to return to the previous page, a previous-page button is depressed. When the old edition button 966 is depressed, the newspaper or magazine displayed on the basis of the press button 952 which was depressed latest is displayed on the display 942 in place of the one-old edition. Each time the old edition button 966 is depressed, the edition which is older one edition by one is displayed. To again display the latest edition, the title display button 962 is depressed.

In a state in which the oldest edition is displayed, when the old edition button 966 is further depressed, a message of "There is no more old edition" is displayed on the edition displayed at present on the display 942. The date to be displayed is updated in accordance with the old edition.

Figure 15:
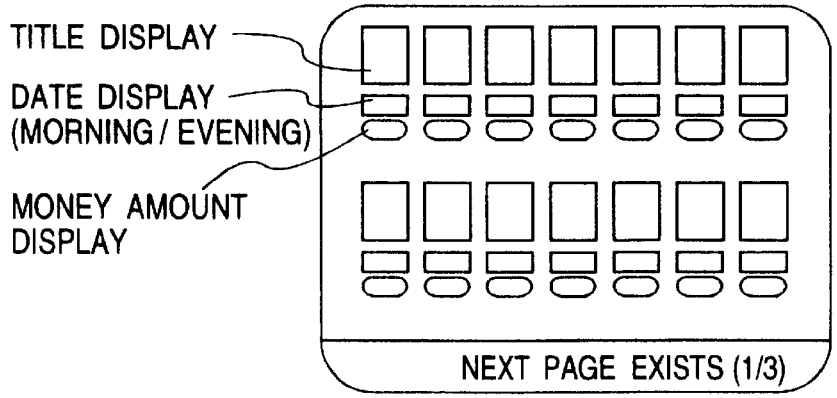
FIG. 15 is a diagram showing a construction of a display of the home-use receiving terminal of the invention.

A display example of the display 942 will now be described with reference to FIG. 15. When the press button 952 is depressed, the write control unit 951 and IC memory card writing mechanism 953 of the data writing system 95 records the electronic press information in which the displayed press or title has been selected to the recording medium 52 (IC memory or the like) that is inserted by the consumer.

In this instance, sales information (time, press ID, etc.) is recorded to the use history recording unit 971 of the charging system 97.

The information recorded on the recording medium 52 (IC memory or the like) can be seen by the television. By depressing the title displaying button 962 of the control terminal 96, the consumer displays a list of the titles, dates, and the like of the presses recorded on the recording medium 52.

By selecting one of the titles by the number (ten-key) and pressing "select", the press can be displayed on the display 942. At this time, the title display disappears. The displayed press can be read by operating the enlarging/reducing button 964, scroll button 965, and page updating button 963 of the control terminal 96. The picture plane is displayed one page by one and is changed by operating the previous-page button and after-page button of the page updating button 963. By setting the number by the ten-key and pressing the previous-page or next-page button of the page updating button 963 after that, the designated page can be displayed.

An enlargement and a reduction can be performed up to eight times of the dimensions. Namely, as a most reduced level, two pages of the longitudinal newspaper, magazine, or the like are displayed on the longitudinal screen such as a TV receiver set. In the standard of the A or B size of newspaper, magazine, or the like, a vertical/lateral ratio of an open area of two pages is equal to about (1:1.4). On the other hand, the vertical/lateral ratio of the television is generally equal to (3:4) (=1:1.33) and that of the wide television is equal to (9:16) (=1:1.78). The vertical direction of the presses are aligned and the center of the press obtained by combining two pages is displayed at the center of the screen. Therefore, in the ordinary television, the picture plane of 94% is displayed in the lateral direction and edges are slightly cut. These portions are displayed by moving the picture plane to the right and left. In the wide television, although the screen in the lateral direction remains, this portion is displayed in white, black, or the like.

The enlargement is performed so that the center of the picture plane before enlargement is also set to the center after completion of the enlargement. Therefore, the consumer sets a portion to be enlarged to the center of the screen by operating the upper, lower, right, and left buttons. When enlarged, so long as there is a news item, it is displayed by using the whole screen even in the wide television.

By pressing the enlarging button of the enlarging/reducing button 964 once, the display image is enlarged twice. By pressing the enlarging button three times, the display image is enlarged eight times. For example, data of two columns in case of the newspaper can be displayed. In this case, 30 characters or less are displayed in the vertical direction and characters can be displayed at a resolution of a display of a 12-dot square per character and the characters can be sufficiently decoded.

When it is desired to select another press, by pressing the title displaying button 962, the titles are displayed. The power source system 98 converts the commercially available power source of 100 ACV into a DC voltage that is used in the apparatus.

Figure 16:
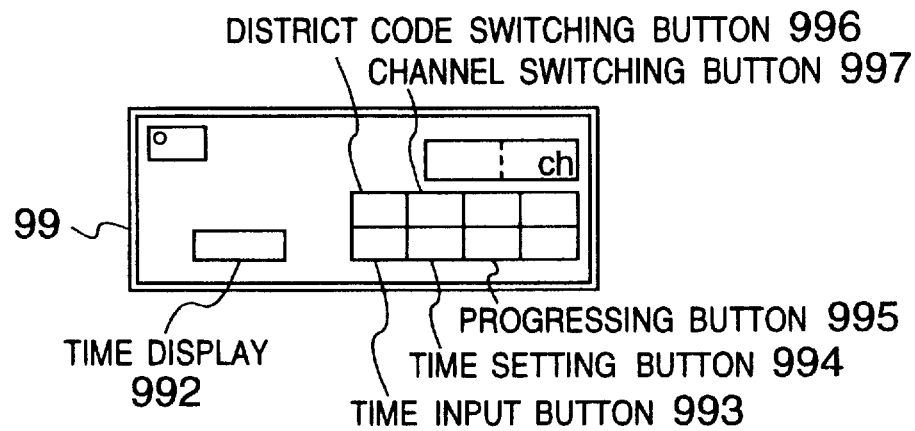
FIG. 16 is a front view of a sheath of the home-use receiving terminal of the invention.
Figure 17:
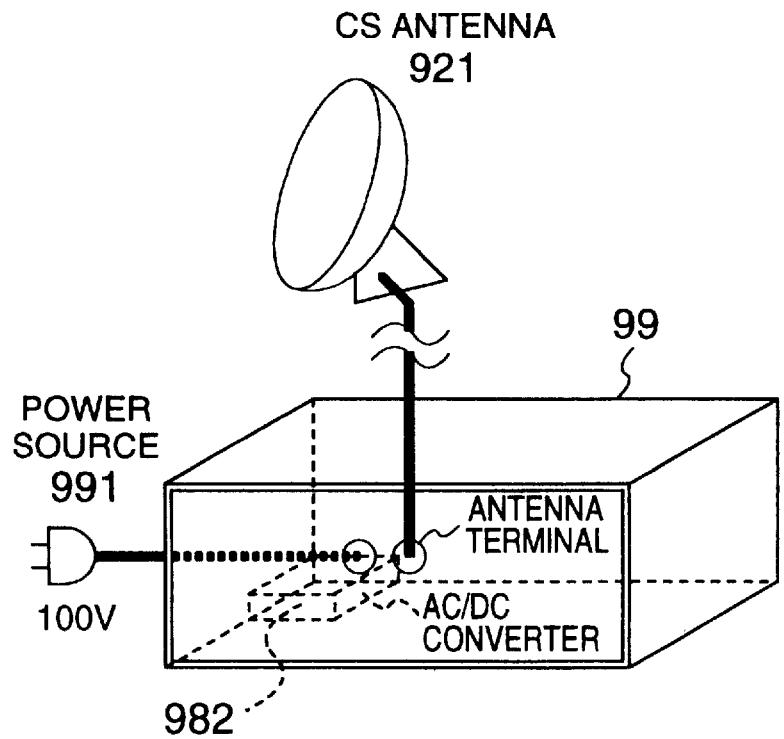
FIG. 17 is a schematic perspective view of the sheath of the home-use receiving terminal of the invention.

FIG. 16 shows a front side of the sheath of the home-use receiving terminal 90. FIG. 17 shows an external view of the sheath.

A time displaying unit 992, a time inputting button 993, a time setting button 994, a progressing button 995, a district code switching button 996, and a channel switching button 997 are provided in the front side of the sheath 99. A power source code 991 and an antenna terminal are provided on the rear side.

[Amount of data which is stored in home-use receiving terminal and data receiving time]

An amount of electronic press information which is updated once by the home-use receiving terminal 90, namely, a data receiving time is the same as that of the vending machine. Namely, in case of a newspaper, it is equal to 200 MB for 20 units. In case of the magazine, it is equal to 300 MB for ten magazines. In case of the advertisements, it is equal to 10 MB. A data amount of 510 MB is necessary as a whole. When transmitting such a data amount of 1.5 Mbps, 17 minutes and 47 seconds are needed for the newspaper, 26 minutes and 40 seconds are needed for the magazine, and 53 seconds are needed for advertisements. As a whole, it is presumed that 45 minutes and 20 seconds are required.

By considering that the data of the new edition has already been updated and the old edition can be also bought (in case of the magazine, one-week before the publication), the data amount of the newspaper which is stored in the home-use receiving terminal 90 is set to a value of ten units when the total data amount of the morning edition and evening edition of a day is set to 20 MB/unit, to a value of five days including the old editions, and to a value of 100 magazines when the data amount is set to 30 MB/magazine. Thus, the total data amount is presumed to be 4 GB. Therefore, although it is desirable to set the data amount of the recording unit (magnetic disk) to 4 GB or more. However, it can be also set to 1 GB as an information amount per day (corresponding to two times) by considering the miniaturization and the reduction of the costs of the apparatus.

[Money collection, installation]

As a money collecting method, a service person visits each home and receives charge information recorded in the home-use receiving terminal 90. As a medium to inform of such information, there is an IC card or prepaid card. The IC card records the use records and the service person collects the fee on the basis of such information. The service person or another person can sell the prepaid card on which a use upper limit has been recorded and the home-use receiving terminal 90 can also operate within a range of such an upper limit.

The service person may be a man from the center or another intermediation trader.

When the home-use receiving terminal 90 is installed in each home, the following works are executed. First, the antenna is pointed in such a direction that the satellite line can be connected. Subsequently, the reception of a radio wave from the center is confirmed. Further, operating functions such as use situation recording, charging function, and the like are confirmed.

[Display by personal computer]

The information recorded on the recording medium by the home-use receiving terminal 90 can be displayed by a personal computer. In this instance, a software for converting the electronic press information recorded on the recording medium into a format suitable for the OS of the personal computer is prepared. The display, use, or the like of the electronic press information are executed by the user of the personal computer within a range of the contract such as a copyright or the like.

According to the electronic press information distributing and transmitting system of the invention, the data of the newspaper, magazine, advertisement, or the like has been transmitted by using the satellite line or the terrestrial line and the data has been received by the outdoor receiving apparatus built in the vending machine and has been once stored in the recording unit. Therefore, the persons which are required for conveyance or delivery can be omitted and the information can be distributed and transmitted at low costs.

Further, since the consumer can use the electronic press information by using the portable terminal, he can purchase arbitrary electronic press information from the electronic press information vending machine through the recording medium.

The low-cost broadcast distribution and transmission can be performed. Namely, electronic press information of a newspaper, a magazine, etc. is distributed and transmitted in a lump to a great number of vending machines installed in the whole country or in a relatively wide district, and as shown in the newspaper or advertisement, different contents (although the magazine has almost the same contents in the whole country, in most cases, the contents of the newspapers are partially different depending on the district. There are also an advertisement and the like which are limited to a specified district.) can be sold in predetermined relatively narrow districts by the electronic press information vending machines.

By making a contract and receiving the electronic press information distributed and transmitted to the vending machine and using the television receiver in a home, the electronic press information can be obtained and displayed even in a general home.

The electronic press information for the vending machines is received by a receiving terminal of a bookstore and is transmitted from the bookstore to a purchaser via a facsimile communication and the received information is recorded on a magnetooptic disk by the bookstore and can be sold. Or, by recording the information to a recording medium which was brought by the purchaser, the information can be sold.

What is claimed is:

1. An electronic press information dispatching system which comprises a producing system, a distributing system, and a consuming system and executes a production and a distribution of electronic press information which a consumer uses by a terminal, wherein said producing system is constructed by a publisher for producing press information and an electronic press information producer for producing the electronic press information, said distributing system is constructed by an electronic press information distribution and sales trader for distributing the electronic press information, said consuming system is constructed by consumers who consume the electronic press information, said electronic press information distribution and sales trader of said distributing system is constructed by a center comprising a receiving system, a recording and editing system, a transmitting system, and a managing system and vending machines which are installed at places such as station, street, and the like where persons gather, one electronic press information distribution and sales trader has a transactional connection with a plurality of electronic press information producers of said producing system and is connected by a terrestrial line such as ISDN, public telephone line or the like, said electronic press information producer has a function for converting newspaper, a magazine, or the like formed by said publisher into electronic press information of a predetermined format, and said electronic press information distribution and sales trader receives specified electronic press information by the receiving system of the center, accumulates the received electronic press information into a recording unit, classifies the press information which is received from each of said electronic press information producers and has been classified on a unit basis of each electronic press information producer in accordance with district characteristics of the information, adds codes including a code to designate all districts and/or a code to designate a plurality of districts in a lump,. to identify a corresponding district to a unit of the press information every district, independently installs a transmission data recording unit every transmitter of each line so that the press information classified per district is dispatched by at least one line sequentially or in parallel, records the electronic press information to be dispatched in accordance with the transmitting order, prepares a command to remotely operate the vending machine from the center and a dispatching procedure data of the electronic press information to be dispatched, and dispatches the electronic press information to the plurality of vending machines by the transmitting system in accordance with said dispatching procedure.

2. A system according to claim 1, wherein as one of said electronic press information, a press such as advertisement and town information or the like that is published by a small scale publishing company and which is effective in only a narrow district and in which the number of pages is relatively small is converted into electronic advertisement and town information by an electronic press forming system provided in the small scale publishing company and is transmitted to the center.

3. A system according to claim 1, wherein as one of said electronic press information, the electronic press information distribution and sales trader also performs works of the electronic press information producer in the center, a publisher brings information by "papers" to the center, and the information is converted into electronic press information by an electronic press information forming apparatus provided in the center.

4. A system according to claim 1, wherein a transmission and a reception of the electronic press information between the electronic press information producer and the electronic press information distributing and sales trader are executed by a recording medium such as a magnetooptic disk or the like, the electronic press information distribution and sales trader obtains the electronic press information by a recording medium reading apparatus installed in the center, and if necessary at that time, a re-edition such as format conversion, addition of annexed information, and the like is executed.

5. A system according to claim 1, wherein a plurality of electronic press information vending machines are installed in a certain narrow range, at least one of said electronic press information vending machines has a function to receive the electronic press information from the center, and said electronic press information vending machine having the receiving function and the other electronic press information vending machines are connected by a local area network.

6. A system according to claim 1, wherein as for the information accumulated in the recording unit in the electronic press information vending machine, when a payment of an information fee is discriminated, desired data in the accumulated information is written to a recording medium such as an IC card or the like.

7. A system according to claim 1, wherein commands to remotely operate the electronic press information vending machine from the center include:

(a) a command receiving request indicative of a transfer of the command from now on;

(b) a vending machine ID for allocating a number to each vending machine;

(c) a district code designation indicating that a district code is designated for each vending machine;

(d) a district code indicative of a code per district;

(e) a channel switching request to request a channel switching;

(f) a channel number indicative of a channel switching destination;

(g) a press information receiving request;

(h) an ID of the press information and a press information ID indicative of a file name;

(i) press information;

(j) a transmission end indicating that the transmission of the press information has been finished;

(k) a channel resetting request to request so as to switch the channel to channel one; and (l) a host to target data transfer request for requesting to transfer the press information or the like from the host to a target by an LAN of the vending machine, and the dispatching procedure of said commands and said electronic press information is executed in a manner that:

(a) a synchronization (sync) code is transmitted and a frame synchronization or the like is performed on the assumption that power sources of all of the vending machines are ON and the vending machines are in a receivable state;

(b) a command receiving request is issued to a specified vending machine, ordinarily, to all of the vending machines;

(c) a vending machine ID and a district code to designate a district code are designated for all of the vending machines, although the whole command transmitting procedure so far is executed by channel one, since parallel processes are executed for the data transmission;

(d) a channel is allocated to the district code and, after that, the channel switching request is issued and the channels are separated;

(e) the sync code and the press information receiving request are issued to each channel and, after that, the data transmission is executed every channel;

(f) after completion of the transmission of all data, each channel issues the channel resetting request and again returns the channel to channel one; and (g) a data transfer to the target vending machine is requested from the host vending machine.

8. An electronic press information dispatching system which comprises a producing system, a distributing system, and a consuming system and executes a production and a distribution of electronic press information which a consumer uses in a home, wherein said producing system is constructed by a publisher for producing press information and an electronic press information producer for producing the electronic press information, said distributing system is constructed by an electronic press information distribution and sales trader for distributing the electronic press information, said consuming system includes a home-use receiving terminal set in a home, receives the electronic press information after making a contract, and displays a news item by using a television set or the like in the home, said electronic press information distribution and sales trader of said distributing system has a center comprising a receiving system, a recording and editing system, a transmitting system, and a managing system, one electronic press information distribution and sales trader has a connection of contract with a plurality of electronic press information producers of said producing system and is connected by a line such as ISDN, public telephone line, or the like, said electronic press information producer has a function for converting press information such as newspaper, magazine, or the like formed by said publisher into electronic press information of a predetermined format, and said electronic press information distribution and sales trader receives specified electronic press information by the receiving system of the center, accumulates the received electronic press information into a recording unit, classifies the press information which is received from each of said electronic press information producers and has been classified on a unit basis of each electronic press information producer in accordance with district characteristics of the information, adds codes including a code to designate all districts and/or a code to designate a plurality of districts in a lump, to identify a corresponding district to a unit of the press information every district, independently installs a transmission data recording unit every transmitter of each line so that the press information classified per district is dispatched by at least one line sequentially or in parallel, records the electronic press information to be transmitted in accordance with the transmitting order, prepares a command to remotely operate the vending machine from the center and a data of dispatching procedure data of the electronic press information to be dispatched, and distributes and transmits the electronic press information to the plurality of home-use receiving terminals by the transmitting system in accordance with said dispatching procedure.

9. An electronic press information dispatching system which comprises a producing system, a distributing system, and a consuming system and which executes a production and a distribution of electronic press information which a consumer uses in a home, wherein said producing system is constructed by a publisher for producing press information and an electronic press information producer for producing the electronic press information, said distributing system is constructed by an electronic press information distribution and sales trader for distributing the electronic press information, said consuming system is constructed by a receiving terminal set in a bookstore and transmits the electronic press information received by said receiving terminal from the bookstore via a facsimile communication, said electronic press information distribution and sales trader of said distributing system has a center comprising a receiving system, a recording and editing system, a transmitting system, and a managing system, one electronic press information distribution and sales trader includes a connection with a plurality of electronic press information producers of said producing system and is connected by a line such as ISDN, public telephone line, or the like, said electronic press information producer has a function for converting press information such as newspaper, magazine, or the like formed by said publisher into electronic press information of a predetermined format, and said electronic press information distribution and sales trader receives specified electronic press information by the receiving system of the center, accumulates the received electronic press information into a recording unit, classifies the press information which is received from each of said electronic press information producers and has been classified on a unit basis of each electronic press information producer in accordance with district characteristics of the information, adds codes including a code to designate all districts and/or a code to designate a plurality of districts in a lump to identify a corresponding district to a unit of the press information every district, independently installs a transmission data recording unit every transmitter of each line so that the press information classified per district is dispatched at least one line sequentially or in parallel, records the electronic press information to be transmitted in accordance with the transmitting order, prepares a command to remotely operate the vending machine from the center and a data of dispatching procedure of the electronic press information to be dispatched, and distributes and transmits the electronic press information to the plurality of receiving terminals by the transmitting system in accordance with said dispatching procedure.

10. A system according to claim 9, wherein the received electronic press information is recorded to a magnetooptic disk and is sold in the bookstore or is recorded to a recording medium which a purchaser brought, thereby selling the information.

11. An electronic press information dispatching system which comprises a producing system, a distributing system, and a consuming system and which executes a production and a distribution of electronic press information which a consumer uses by a terminal, wherein said producing system has a function to produce press information and convert the produced press information to electronic press information, said distributing system has a function to rearrange the electronic press information produced by said producing system, a function to dispatch the rearranged electronic press information to a plurality of electronic press vending machines for selling said information, and an electronic press vending machine to sell the electronic press information, said consuming system is constructed by consumers who purchase the electronic press information to a recording medium from the electronic press vending machine, said rearranging function and said dispatching function are constructed as a center comprising a receiving system to receive the electronic press information from said producing system, a recording and editing system for recording and rearranging the electronic press information, a transmitting system for dispatching the rearranged electronic press information, and a managing system, said distributing system has a connection with said producing system of the electronic press information and is connected by a line such as ISDN line or public telephone line or the like, and said center has means for accumulating the received electronic press information, a function for again classifying the received press information classified on a unit basis of each electronic press information producer on the basis of district characteristics of the information, a function for adding a code to identify a corresponding district every district on a press information unit basis, a function for dispatching the press information classified per district by one or a plurality of lines sequentially or in parallel, a transmission data recording unit independently provided for every transmitter of each line, a command to remotely operate an electronic press vending machine from the center, and a data of dispatching procedure of the electronic press information to be dispatched, and the electronic press information to be transmitted is recorded into said transmission data recording unit in accordance with the transmitting order, and the electronic press information is dispatched to a plurality of vending machines by the transmitting system in accordance with said dispatching procedure.

12. An electronic press information dispatching system, wherein even in case of district editions having a same name, when a dispatching district differs depending on each newspaper company, information of a name of the newspaper company or a name of the district edition is possessed to electronic press information to be transmitted from an electronic press producer to a center or is added as a specified district code, thereby converting said specified district code into a district code which corresponds to a vending machine ID in a one-to-one corresponding relation in a signal processing unit of the center and dispatching the electronic press information to a desired district.

13. An electronic press information vending machine in a system comprising a center for collecting and editing electronic press information and dispatching the information by a satellite communication, electronic press information vending machines which are installed at places such as station, street, and the like where persons gather, and a portable terminal using said electronic press information, wherein said electronic press information vending machine comprises an electronic press information sales system constructed by a communicating system, a signal processing system, a displaying system, and a data writing system and a vending machine common system constructed by a charging system, a money charging system, a sheath, and a power source system, said communicating system is constructed by an antenna, a communication satellite (CS) digital tuner, and the like, said signal processing system is constructed by a data processing unit and a recording unit, a press portion display, a title display, and a date display of each of a plurality of display system which are arranged, tens of sets each comprising a press button, an old edition button, and a write instructing button of a data writing system, an IC memory card inserting port as a part of an IC memory card writing mechanism, a cash inserting port and a change ejecting port as parts of a cash processing unit of a charging system, a no-change display unit, a display unit indicating an input money amount which corresponds the remaining amount of a prepaid card, and a prepaid card inserting port and a cancelling button as parts of a prepaid card processing unit are arranged on a front side of a sheath of said electronic press information vending machine, a terminal for a local area network (LAN) and an antenna terminal are arranged on a rear side of said sheath and an antenna terminal is also provided on an upper surface, the antenna for communication can be mechanically attached to said sheath, said electronic press information dispatched from the center is received by the antenna, a demodulation, a bit synchronization, a frame synchronization, an error correction, and a descramble are executed by the CS digital tuner, and thereafter, the electronic press information is recorded as one file into the recording unit on a press information unit basis by the data processing unit of the signal processing system, titles of latest editions of all kinds of newspapers, magazines, and advertisements recorded in the vending machine are displayed by a title display to display by an LED or a print such as a paper or the like, dates of said presses are displayed by a date display, prices are displayed on a press button, a purchaser presses a news item selecting button of a desired newspaper or magazine, a cover of the magazine and a predetermined part in the press such as a portion of right upper ¼ of the first page of the newspaper or the like are displayed by a press portion display, thereby selecting a press to be purchased, a recording medium of a portable terminal such as an IC memory card or the like is inserted, cash or a prepaid card is inserted, a write instructing button is subsequently depressed, so that a write control unit and an IC memory card writing mechanism of a data writing system record the electronic press information to a recording medium which is inserted by a consumer, and when the old edition button is depressed, a one-old edition of the newspaper or magazine shown by the press button which was depressed latest is displayed by the press portion display on which said latest edition has been displayed so far, each time the old edition button is depressed, the edition which is old one edition by one is displayed, the press button is depressed to again display the latest edition, in a state in which an oldest edition is displayed, when the old edition button is further depressed, a message such as "No more old edition" or the like is displayed on the edition or the like which is displayed at present by the title display, the date which is shown by the date display is changed in accordance with the old edition, and a fee is charged in cash or by a prepaid card.

14. A vending machine according to claim 13, wherein as said press portion display, a liquid crystal panel of 7 inches or larger in which the number of pixels lies within a range from (320×240) to (1280×960) is used or a CRT or the like of 7 inches or larger is used, and data is displayed as a longitudinal or wide image by scanning lines of the number of 1000 or less like an NTSC used in a television broadcasting or the like.

15. A vending machine according to claim 13, wherein a plurality of press portion displays are attached and a part of the press is displayed in accordance with the depressing order of the press button, however, in a state in which it is displayed by all of the displays, when another press button is further depressed, display contents corresponding to the press button which was depressed oldest are deleted and changed to the press corresponding to the press designated by said another press button depressed.

16. A vending machine according to claim 13, wherein when the press button is not depressed for a predetermined time or longer, a part or all of a plurality of preset presses to be sold are sequentially displayed at a certain predetermined time interval.

17. A vending machine according to claim 13, wherein when the press button is not depressed for a predetermined time or longer, a summary, a commercial, or the like of newspaper, magazine, advertisement, or the like to be sold is displayed.

18. A vending machine according to claim 13, wherein after the electronic press information has been written into the IC memory card inserted, it is read out and collated with the written electronic press information which the vending machine has, and when they coincide, the recording medium is taken out from the vending machine, a fee is charged, and when the cancelling button has been depressed so far, a fee is set to be free and the recording medium is returned.

19. An electronic press information dispatching system which edits, distributes, transmits, and sells electronic press information converted into electronic information and uses by a terminal, comprising:
 a center for receiving a plurality of electronic press information, editing said received electronic press information per dispatching district, and dispatching said electronic press information per district through a satellite line;
 a plurality of vending machines for receiving the electronic press information dispatched from the center, recording the electronic press information to a portable recording medium, and selling the information; and
 a plurality of portable terminals using the electronic press information through the portable recording medium on which the electronic press information has been recorded by said vending machine.

20. A system according to claim 19, wherein said vending machines are connected to every plural machines by a local area network, and the electronic press information which has been dispatched from the center by a satellite line is transmitted to the other vending machines connected by said local area network.

21. A system according to claim 19, wherein said center transmits the electronic press information and a command to control said vending machines and remotely controls said vending machines.

22. A system according to claim 19, wherein said center receives the electronic press information by an ISDN line or a recording medium on which the electronic press information has been recorded, also receives press information by a paper which is not converted into electronic information, converts into the electronic press information in the center, and edits, distributes, and transmits said electronic press information together with other electronic press information.

23. A system according to claim 19, wherein a home-use receiving terminal for receiving the electronic press information which is dispatched from said center is further provided for each home, and said electronic press information received by said home-use receiving terminal is recorded to a recording medium and is used.

24. A system according to claim 19, wherein a receiving terminal for receiving the electronic press information which is dispatched from said center is further provided for a bookstore, and said electronic press information received by said receiving terminal is transmitted from the bookstore to a purchaser or is recorded to a recording medium and is sold.

25. A system according to claim 23, wherein a receiving terminal for receiving the electronic press information which is dispatched from said center is further provided for a bookstore, and said electronic press information received by said receiving terminal is transmitted from the bookstore to a purchaser or is recorded to a recording medium and is sold.

26. A center in an electronic press information dispatching system for editing, distributing, transmitting, and selling electronic press information converted into electronic press information and for using said information by a terminal, wherein the center for receiving a plurality of electronic press information formed by a plurality of electronic press producers and dispatching said electronic press information to a plurality of vending machines through a satellite line, comprising:
 a receiving unit for receiving the electronic press information formed by said plurality of electronic press producers;
 a recording and editing unit for recording the received electronic press information per producer, subsequently editing said electronic press information per dispatch district, and rearranging said information per dispatching district;
 a transmitting unit for dispatching the electronic press information which has been rearranged per dispatch district to a plurality of vending machines through a satellite line; and
 a managing unit for performing a fee management for said electronic press producers and a management and a remote operation of said vending machines.

27. A center according to claim 26, wherein the electronic press information received by said receiving unit includes a district code indicative of the dispatch district, said managing unit gives a second district code to each of said vending machines, said recording and editing unit converts said district code added to said electronic press information into said second district code, edits the electronic press information per said second district code, and rearranges said information, and said transmitting unit dispatches the electronic press information which was rearranged per said second district code to the plurality of vending machines through a satellite line.

28. A vending machine in an electronic press information dispatching system for editing, dispatching, and selling electronic press information which has been converted into electronic press information and using said information by a terminal, wherein the vending machine for receiving the electronic press information which has been dispatched through a satellite line, recording said electronic press information to a portable recording medium, and selling, comprising:

a communicating unit for receiving the electronic press information dispatched through the satellite line;

a signal processing unit for dividing said electronic press information on a unit basis of a group of press information and recording the divided information;

various buttons adapted for a user to select the electronic press information recorded by said signal processing unit;

a display unit for displaying the electronic press information;

a data write unit for writing the electronic press information selected by the user onto a portable recording medium;

a charge unit for charging a fee for sales of said electronic press information; and a money collecting unit for recording an amount of money from the sales, and wherein said vending machine is connected to the other vending machines by a local area network (LAN) and a transmission and a reception of the electronic press information are executed between the vending machines by said LAN.

29. A vending machine in an electronic press information dispatching system for editing, distributing, transmitting, and selling electronic press information converted into electronic press information and using said information by a terminal, wherein said vending machine records said electronic press information to a portable recording medium and sells, said vending machine is connected to the other vending machines by a LAN and comprises:

a receiving unit for receiving the electronic press information by said LAN;

a signal processing unit for dividing said electronic press information on a unit basis of a group of press information and recording the divided information;

various buttons adapted for a user to select the electronic press information recorded by said signal processing unit;

a display unit for displaying the electronic press information;

a data write unit for writing the electronic press information selected by said user to a portable recording medium;

a charge unit for charging a fee for sales of the electronic press information; and a money collecting unit for recording an amount of money from the sales.

30. A home-use receiving terminal in an electronic press information dispatching system for editing, distributing, transmitting, and selling electronic press information converted into electronic press information and using said information by a terminal, wherein a home-use receiving terminal for receiving the electronic press information dispatched through a satellite line and using in each home comprises:

a communicating unit for receiving the electronic press information dispatched through the satellite line;

a signal processing unit for dividing said electronic press information on a unit basis of a group of press information and recording the divided information;

a data write unit for writing the electronic press information selected by a user to a portable recording medium;

a control terminal adopted for the user to select and operate the electronic press information recorded by said signal processing unit or on said portable recording medium;

a display unit for displaying the electronic press information; and a use history recording unit for recording the use of the electronic press information for charging.

\* \* \* \* \*